United States Patent
Zhang et al.

(10) Patent No.: US 12,045,383 B2
(45) Date of Patent: Jul. 23, 2024

(54) VIRTUAL AR INTERFACES FOR CONTROLLING IOT DEVICES USING MOBILE DEVICE ORIENTATION SENSORS

(71) Applicants: Lei Zhang, Ann Arbor, MI (US);
Youjean Cho, New York, NY (US);
Daekun Kim, Santa Monica, CA (US);
Ava Robinson, Solana Beach, CA (US);
Yu Jiang Tham, Seattle, WA (US);
Rajan Vaish, Beverly Hills, CA (US);
Andrés Monroy-Hernández, Seattle, WA (US)

(72) Inventors: Lei Zhang, Ann Arbor, MI (US);
Youjean Cho, New York, NY (US);
Daekun Kim, Santa Monica, CA (US);
Ava Robinson, Solana Beach, CA (US);
Yu Jiang Tham, Seattle, WA (US);
Rajan Vaish, Beverly Hills, CA (US);
Andrés Monroy-Hernández, Seattle, WA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/901,568

(22) Filed: Sep. 1, 2022

(65) Prior Publication Data
US 2024/0077934 A1    Mar. 7, 2024

(51) Int. Cl.
*G06F 3/01* (2006.01)
*G06F 1/16* (2006.01)
*G06T 19/00* (2011.01)

(52) U.S. Cl.
CPC ............ *G06F 3/011* (2013.01); *G06F 1/163* (2013.01); *G06T 19/006* (2013.01)

(58) Field of Classification Search
CPC .......... G06F 15/16; G06F 3/011; G06F 3/048; G06F 3/04815; G06F 3/04847;
(Continued)

(56) References Cited

U.S. PATENT DOCUMENTS 10,031,581 B1   7/2018   Raman et al.
10,110,678 B2   10/2018  Hebsur et al.
(Continued)

FOREIGN PATENT DOCUMENTS

KR   20170108285 A   9/2017
WO   2018102615      6/2018

OTHER PUBLICATIONS

International Search Report and Written Opinion for International Application No. PCT/US2023/028720, dated Nov. 7, 2023 (Nov. 7, 2023)—10 pages.

(Continued)

*Primary Examiner* — Nelson M Rosario
(74) *Attorney, Agent, or Firm* — Culhane PLLC; Stephen J. Weed

(57) ABSTRACT

Described are virtual AR interfaces for generating a virtual rotational interface for the purpose of controlling connected IoT devices using the inertial measurement unit (IMU) of a portable electronic device. The IMU control application enables a user of a portable electronic device to activate a virtual rotational interface overlay on a display and adjust a feature of a connected IoT product by rotating a portable electronic device. The device IMU moves a slider on the virtual rotational interface. The IMU control application sends a control signal to the IoT product which executes an action in accordance with the slider position. The virtual rotational interface is presented on the display as a virtual object in an AR environment. The IMU control application detects the device orientation (in the physical environment) and in response presents a corresponding slider element on the virtual rotational interface (in the AR environment).

17 Claims, 14 Drawing Sheets

(58) Field of Classification Search
CPC .......... G06F 3/0482; G06F 9/451; G06F 9/54; H04L 67/12
See application file for complete search history.

(56) References Cited

U.S. PATENT DOCUMENTS

| | | |
|---|---|---|
| 10,496,253 B2 | 12/2019 | Keller |
| 10,831,267 B1 | 11/2020 | Golard et al. |
| 10,921,764 B2 | 2/2021 | Mao et al. |
| 10,936,280 B2 | 3/2021 | Lin |
| 11,406,896 B1 | 8/2022 | Cheung et al. |
| 2004/0091848 A1 | 5/2004 | Nemitz |
| 2006/0003824 A1 | 1/2006 | Kobayashi et al. |
| 2006/0041546 A1 | 2/2006 | Ahn |
| 2007/0124507 A1 | 5/2007 | Gurram et al. |
| 2009/0300676 A1 | 12/2009 | Harter, Jr. |
| 2010/0092930 A1 | 4/2010 | Fletcher et al. |
| 2011/0165939 A1 | 7/2011 | Borst et al. |
| 2011/0314381 A1 | 12/2011 | Fuller et al. |
| 2012/0284426 A1 | 11/2012 | Smith et al. |
| 2013/0307855 A1 | 11/2013 | Lamb et al. |
| 2013/0307856 A1 | 11/2013 | Keane et al. |
| 2014/0080109 A1 | 3/2014 | Haseltine et al. |
| 2014/0282013 A1 | 9/2014 | Amijee |
| 2014/0368533 A1 | 12/2014 | Salter et al. |
| 2015/0165310 A1 | 6/2015 | Rebh et al. |
| 2015/0347114 A1* | 12/2015 | Yoon .................. H04L 12/2832 717/176 |
| 2016/0274705 A1 | 9/2016 | Kapadia et al. |
| 2017/0142324 A1 | 5/2017 | Jost et al. |
| 2017/0220134 A1 | 8/2017 | Burns et al. |
| 2018/0047396 A1 | 2/2018 | Forutanpour et al. |
| 2018/0053351 A1 | 2/2018 | Anderson |
| 2019/0066387 A1 | 2/2019 | Grossmann et al. |
| 2019/0107927 A1 | 4/2019 | Schriber et al. |
| 2019/0114061 A1 | 4/2019 | Daniels et al. |
| 2019/0188917 A1* | 6/2019 | Cho ...................... G06T 15/506 |
| 2019/0244427 A1 | 8/2019 | Sun et al. |
| 2019/0361575 A1 | 11/2019 | Ni et al. |
| 2019/0371002 A1 | 12/2019 | Hwang et al. |
| 2019/0371071 A1 | 12/2019 | Lyons |
| 2020/0042286 A1 | 2/2020 | Bui et al. |
| 2020/0118343 A1 | 4/2020 | Koblin et al. |
| 2020/0326831 A1 | 10/2020 | Marr |
| 2020/0326837 A1 | 10/2020 | Ni |
| 2020/0334463 A1 | 10/2020 | Shapira |
| 2020/0338451 A1 | 10/2020 | Wang |
| 2021/0084233 A1 | 3/2021 | Faaborg et al. |
| 2021/0183158 A1 | 7/2021 | Korngold et al. |
| 2021/0196174 A1 | 7/2021 | Tarnanas et al. |
| 2021/0216145 A1 | 7/2021 | Monge Nunez et al. |
| 2021/0256865 A1 | 8/2021 | Koshiba et al. |
| 2021/0342047 A1 | 11/2021 | Badr et al. |
| 2022/0083198 A1 | 3/2022 | Kaehler et al. |
| 2022/0253808 A1 | 8/2022 | Ferguson et al. |
| 2022/0398798 A1 | 12/2022 | Baradaran |
| 2023/0120437 A1 | 4/2023 | Simic et al. |

OTHER PUBLICATIONS

International Search Report and Written Opinion for International Application No. PCT/US2023/028776, dated Nov. 15, 2023 (Nov. 15, 2023)—10 pages.

International Search Report and Written Opinion for International Application No. PCT/US2023/028788, dated Nov. 8, 2023 (Nov. 8, 2023)—10 pages.

International Search Report and Written Opinion for International Application No. PCT/US2023/028882, dated Nov. 15, 2023 (Nov. 15, 2023)—8 pages.

International Search Report and Written Opinion for International Application No. PCT/US2023/028885, dated Nov. 13, 2023 (Nov. 13, 2023)—10 pages.

* cited by examiner

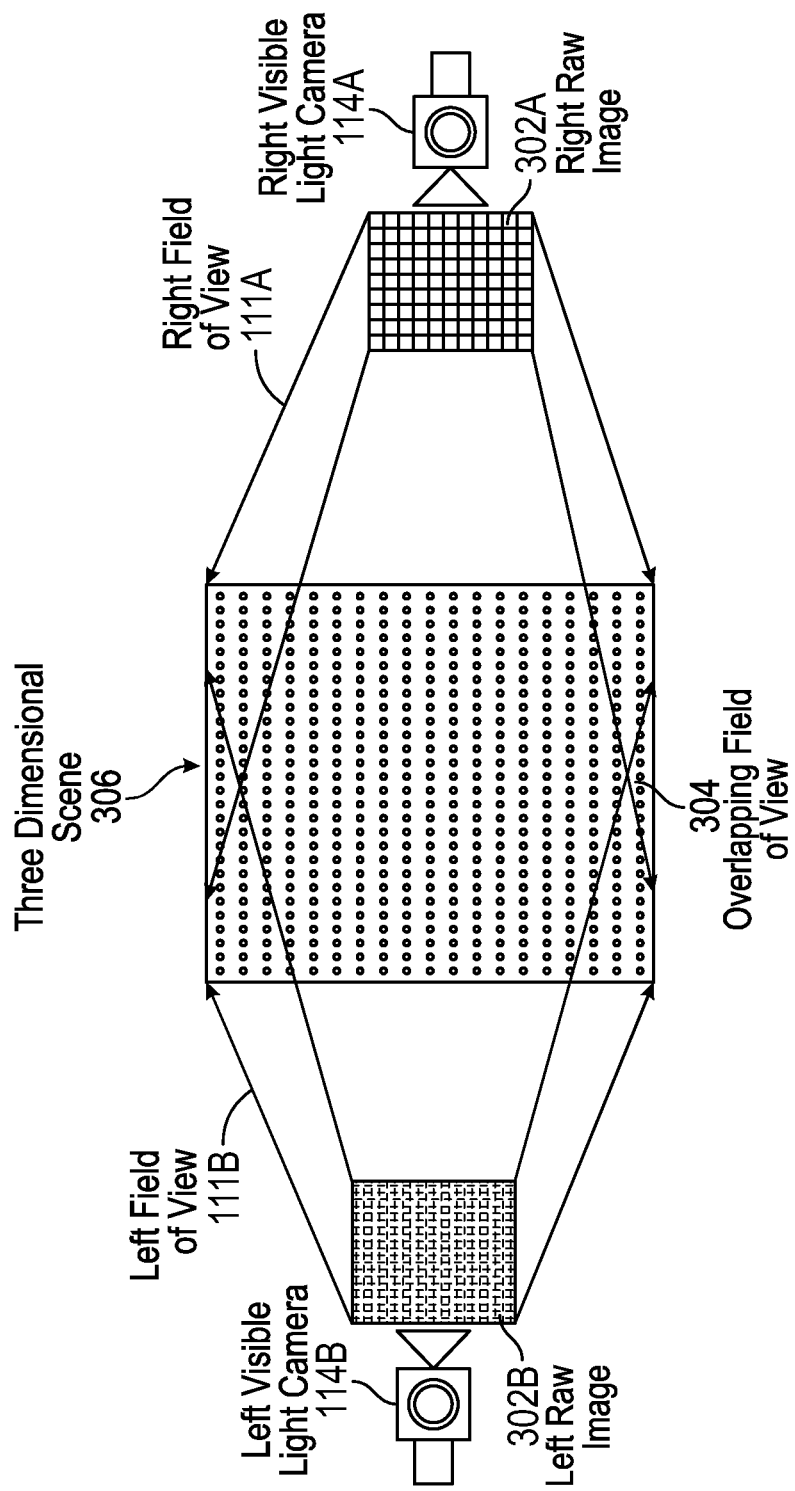

VIRTUAL AR INTERFACES FOR CONTROLLING IOT DEVICES USING MOBILE DEVICE ORIENTATION SENSORS

TECHNICAL FIELD

Examples set forth in the present disclosure relate to the field of augmented reality (AR) experiences for electronic devices, including portable electronic devices and wearable devices such as eyewear. More particularly, but not by way of limitation, the present disclosure describes AR applications for displaying virtual rotational interfaces that enable users to interact with and control connected IoT devices using the inertial measurement unit (IMU) of a mobile device.

BACKGROUND

Many types of computers and electronic devices available today, such as mobile devices (e.g., smartphones, tablets, and laptops), handheld devices, and wearable devices (e.g., smart glasses, digital eyewear, headwear, headgear, and head-mounted displays), include a variety of cameras, sensors, wireless transceivers, input systems, and displays. Users sometimes refer to information on these devices during physical activities such as exercise.

The so-called "Internet of Things" (IoT) refers to and includes physical products that are embedded with sensors, software, and other technologies for enabling connection and exchange of data with other devices, in a network, often over the Internet. For example, IoT products are used in home automation to control lighting, heating and air conditioning, media and security systems, and camera systems. A number of IoT-enabled devices have been provided that function as smart home hubs to connect different smart home products. IoT devices have been used in a number of other applications as well. Application layer protocols and supporting frameworks have been provided for implementing such IoT applications. For example, some IoT products include an application programming interface (API) that allows the IoT product to pair with and otherwise communicate with other products and electronic devices, such as portable computers. Artificial intelligence has also been combined with the Internet of Things infrastructure to achieve more efficient IoT network operations, improve human-machine interactions, and enhance data management and analytics.

Virtual reality (VR) technology generates a complete virtual environment including realistic images, sometimes presented on a VR headset or other head-mounted display. VR experiences allow a user to move through the virtual environment and interact with virtual objects. AR is a type of VR technology that combines real objects in a physical environment with virtual objects and displays the combination to a user. The combined display gives the impression that the virtual objects are authentically present in the environment, especially when the virtual objects appear and behave like the real objects. Cross reality (XR) is generally understood as an umbrella term referring to systems that include or combine elements from AR, VR, and MR (mixed reality) environments.

BRIEF DESCRIPTION OF THE DRAWINGS

Features of the various examples described will be readily understood from the following detailed description, in which reference is made to the figures. A reference numeral is used with each element in the description and throughout the several views of the drawing. When a plurality of similar elements is present, a single reference numeral may be assigned to like elements, with an added upper or lower-case letter referring to a specific element.

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawing are the following figures:

FIG. 3 is a block diagram illustrating an example of capturing visible light using an example eyewear device illustrated in any of the proceeding figures;

DETAILED DESCRIPTION

Figure 1A:
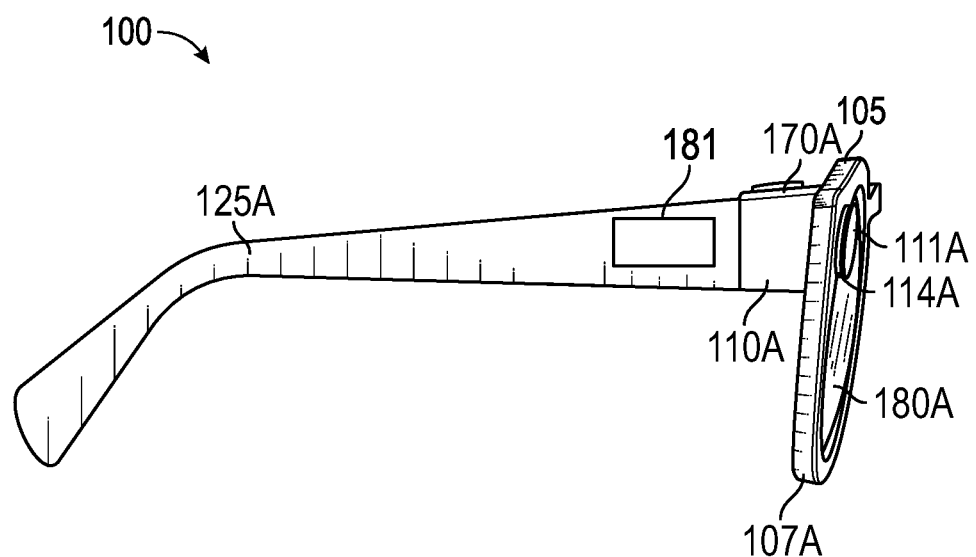
FIG. 1A is a side view (right) of an eyewear device suitable for use in an example IMU control system.

A IMU control system for use with AR applications on portable electronic devices, including mobile phones and wearable devices such as electronic eyewear devices. The IMU control system enables the user of a portable electronic device to view a virtual rotational interface that is presented on the display near an IoT product. The user can tilt the electronic device in order to interact with the virtual rotational interface, thereby adjusting one or more controllable features (e.g., on, off, volume, brightness) of the IoT product.

Various implementations and details are described with reference to examples for presenting a virtual rotational interface in an augmented reality environment to control an IoT product using the IMU of a portable electronic device that has a camera and a display. In an example implementation, a method involves capturing frames of video data with the camera and detecting the IoT product at an IoT product location in a physical environment using the captured frames of video data. This example method also includes determining a portable electronic device location relative to the IoT product location, and then presenting on the display a virtual rotational interface according to the IoT product location and the portable electronic device location. An example virtual rotational interface includes a slider that is virtually presented at a slider position according to the detected device orientation. The slider position corresponds to an IoT action (e.g., adjusting a variable feature, such as volume, brightness, or color hue). The example method includes sending a control signal to the IoT product, wherein the control signal includes instructions for use by the IoT product to perform the IoT action.

Although the various systems and methods are described herein with reference to an IMU controlling a slider in a curved viewport that is generally coplanar relative to the display, the technology described herein may be applied to any of a variety of orientation sensors in a portable electronic device controlling a slider or another kind of movable virtual element, with or without a viewport or track. Moreover, the technology described herein may be applied to control one or more variable features of a connected IoT product using movements of a portable electronic device along or near any plane of rotation (e.g., roll, pitch, yaw). For example, a variable feature (e.g., volume) may be controlled by moving the portable electronic device about or nearly about the z-axis (e.g., yaw). Another feature (e.g., channel selection) may be controlled by moving the portable electronic device about or nearly about the y-axis (e.g., roll). Yet another feature (e.g., brightness) may be controlled by moving the portable electronic device about an arbitrary axis (e.g., in an arbitrary non-orthogonal plane). In this aspect, the virtual rotational interface described herein is useful for controlling a variety of features associated with IoT consumer products, such as lamps, speakers, and fans, as well as IoT products used for commercial, medical, and industrial applications of all kinds.

The following detailed description includes systems, methods, techniques, instruction sequences, and computer program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and methods described because the relevant teachings can be applied or practiced in a variety of ways. The terminology and nomenclature used herein is for the purpose of describing particular aspects only and is not intended to be limiting. In general, well-known instruction instances, protocols, structures, and techniques are not necessarily shown in detail.

The term "connect," "connected," "couple," and "coupled" as used herein refers to any logical, optical, physical, or electrical connection, including a link or the like by which the electrical or magnetic signals produced or supplied by one system element are imparted to another coupled or connected system element. Unless described otherwise, coupled or connected elements or devices are not necessarily directly connected to one another and may be separated by intermediate components, elements, or communication media, one or more of which may modify, manipulate, or carry the electrical signals. The term "on" means directly supported by an element or indirectly supported by the element through another element integrated into or supported by the element.

The term "proximal" is used to describe an item or part of an item that is situated near, adjacent, or next to an object or person; or that is closer relative to other parts of the item, which may be described as "distal." For example, the end of an item nearest an object may be referred to as the proximal end, whereas the generally opposing end may be referred to as the distal end.

The orientations of the eyewear device, associated components and any complete devices incorporating an eye scanner and camera such as shown in any of the drawings, are given by way of example only, for illustration and discussion purposes. In operation for a particular variable optical processing application, the eyewear device may be oriented in any other direction suitable to the particular application of the eyewear device, for example up, down, sideways, or any other orientation. Also, to the extent used herein, any directional term, such as front, rear, inwards, outwards, towards, left, right, lateral, longitudinal, up, down, upper, lower, top, bottom and side, are used by way of example only, and are not limiting as to direction or orientation of any optic or component of an optic constructed as otherwise described herein.

Advanced AR technologies, such as computer vision and object tracking, may be used to produce a perceptually enriched and immersive experience. Computer vision algorithms extract three-dimensional data about the physical world from the data captured in digital images or video. Object recognition and tracking algorithms are used to detect an object in a digital image or video, estimate its orientation or pose, and track its movement over time. The recognition and tracking in real time of body parts, such as hands and fingers, arms and legs, and feet is one of the most challenging and processing-intensive tasks in the field of computer vision.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

In sample configurations, eyewear devices with augmented reality (AR) capability are used in the systems described herein. Eyewear devices are desirable to use in the system described herein as such devices are scalable, customizable to enable personalized experiences, enable effects to be applied anytime, anywhere, and ensure user privacy by enabling only the user to see the transmitted information. An eyewear device such as SPECTACLES™ available from Snap, Inc. of Santa Monica, California, may be used without any specialized hardware in a sample configuration.

As shown in FIGS. 1A-1D, the eyewear device 100 includes a first camera 114A and a second camera 114B. The cameras 114 capture image information for a scene from separate viewpoints. The captured images may be used to project a three-dimensional display onto an image display for three dimensional (3D) viewing.

The cameras 114 are sensitive to the visible-light range wavelength. Each of the cameras 114 define a different frontward facing field of view, which are overlapping to enable generation of 3D depth images; for example, a first camera 114A defines a first field of view 111A and a second camera 114B defines a second field of view 111B. Generally, a "field of view" is the part of the scene that is visible through the camera at a particular position and orientation in space. The fields of view 111 have an overlapping field of view 304 (FIG. 3). Objects or object features outside the field of view 111 when the camera captures the image are not recorded in a raw image (e.g., photograph or picture). The field of view describes an angle range or extent, which the image sensor of the camera 114 picks up electromagnetic radiation of a given scene in a captured image of the given scene. Field of view can be expressed as the angular size of the view cone; i.e., an angle of view. The angle of view can be measured horizontally, vertically, or diagonally.

In an example configuration, one or both cameras 114 has a field of view of 100° and a resolution of 480×480 pixels. The "angle of coverage" describes the angle range that a lens of the cameras 114 can effectively image. Typically, the camera lens produces an image circle that is large enough to cover the film or sensor of the camera completely, possibly including some vignetting (e.g., a darkening of the image toward the edges when compared to the center). If the angle of coverage of the camera lens does not fill the sensor, the image circle will be visible, typically with strong vignetting toward the edge, and the effective angle of view will be limited to the angle of coverage.

Examples of suitable cameras 114 include a high-resolution complementary metal-oxide-semiconductor (CMOS) image sensor and a digital VGA camera (video graphics array) capable of resolutions of 480p (e.g., 640×480 pixels), 720p, 1080p, or greater. Other examples include cameras 114 that can capture high-definition (HD) video at a high frame rate (e.g., thirty to sixty frames per second, or more) and store the recording at a resolution of 1216 by 1216 pixels (or greater).

The eyewear device 100 may capture image sensor data from the cameras 114 along with geolocation data, digitized by an image processor, for storage in a memory. The cameras 114 capture respective raw images (e.g., left and right raw images) in the two-dimensional space domain that comprise a matrix of pixels on a two-dimensional coordinate system that includes an X-axis for horizontal position and a Y-axis for vertical position. Each pixel includes a color attribute value (e.g., a red pixel light value, a green pixel light value, or a blue pixel light value); and a position attribute (e.g., an X-axis coordinate and a Y-axis coordinate).

In order to capture stereo images for later display as a 3D projection, the image processor 412 (FIG. 4) may be coupled to the cameras 114 to receive and store the visual image information. The image processor 412, or another processor, controls operation of the cameras 114 to act as a stereo camera simulating human binocular vision and may add a timestamp to each image. The timestamp on each pair of images allows display of the images together as part of a 3D projection. 3D projections produce an immersive, life-like experience that is desirable in a variety of contexts, including virtual reality (VR) and video gaming.

Figure 1B:
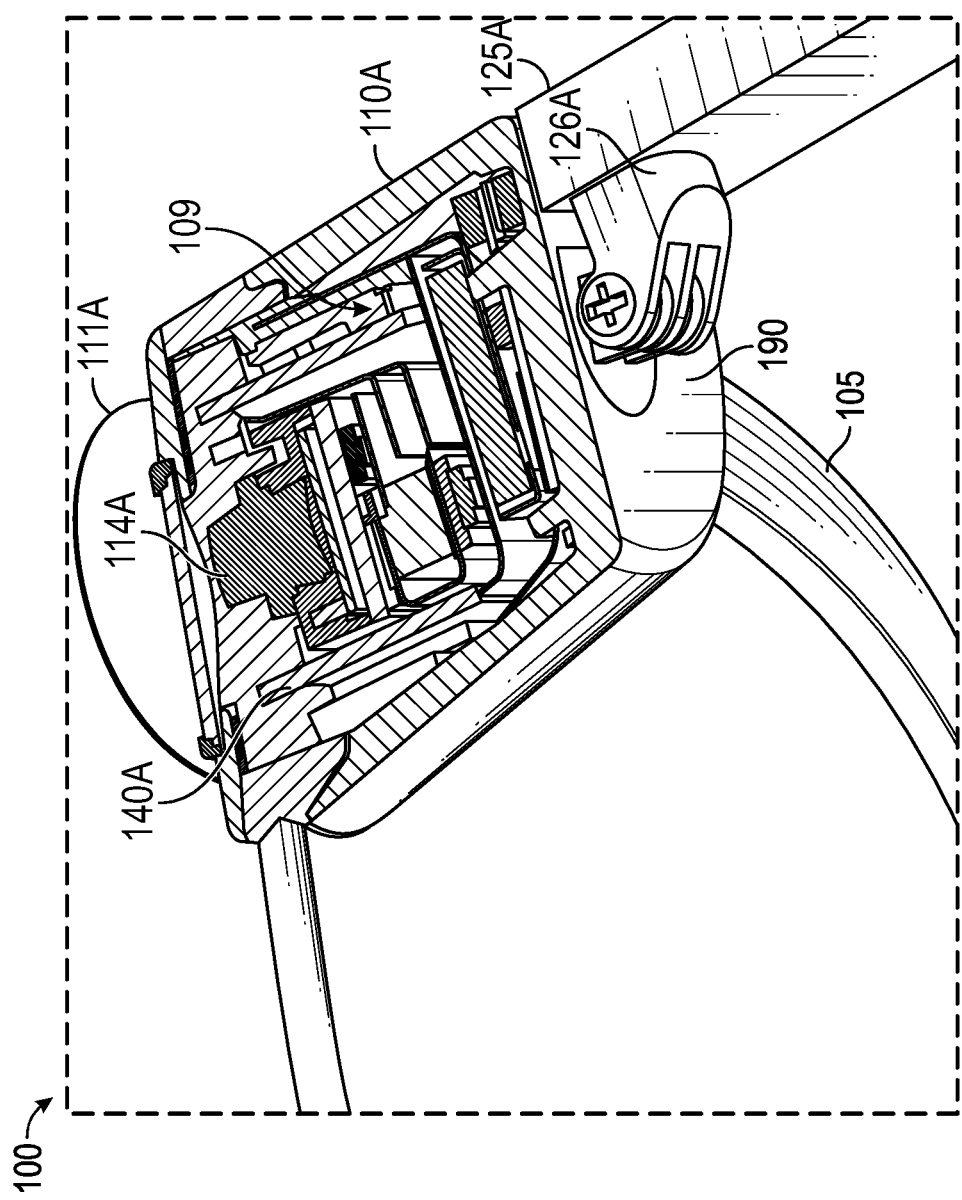
FIG. 1B is a perspective, partly sectional view of optical components and electronics in a portion of the eyewear device illustrated in FIG. 1A.
Figure 1C:
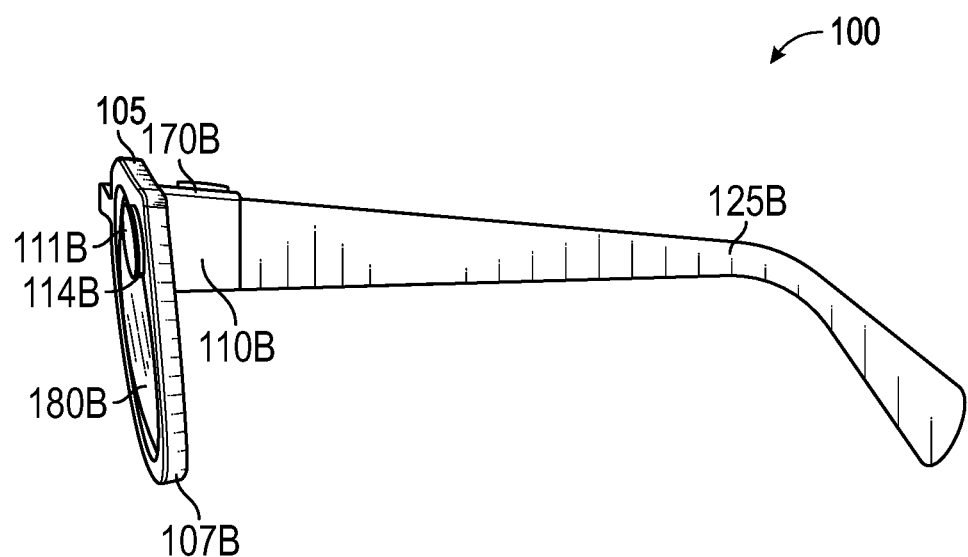
FIG. 1C is a side view (left) of the eyewear device of FIG. 1A.
Figure 1D:
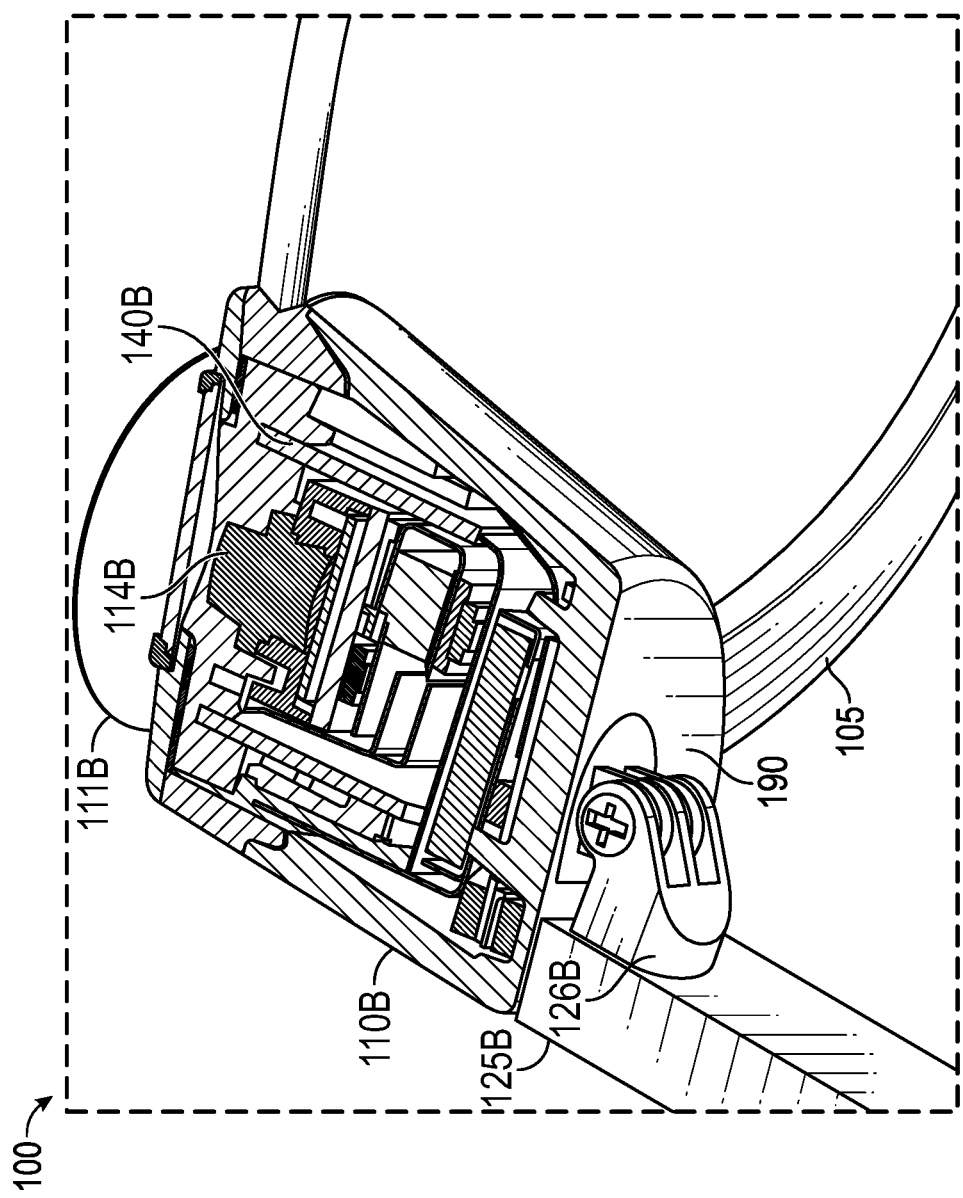
FIG. 1D is a perspective, partly sectional view of optical components and electronics in a portion of the eyewear device illustrated in FIG. 1C.

FIG. 1B is a perspective, cross-sectional view of a right corner 110A of the eyewear device 100 of FIG. 1A depicting the first camera 114A, additional optical components, and electronics. FIG. 1C is a side view (left) of an example hardware configuration of an eyewear device 100 of FIG. 1A, which shows the second camera 114B of the camera system. FIG. 1D is a perspective, cross-sectional view of a left corner 110B of the eyewear device 100 of FIG. 1C depicting the second camera 114B of the camera system, additional optical components, and electronics.

As shown in the example of FIG. 1B, the eyewear device 100 includes the first camera 114A and a circuit board 140A, which may be a flexible printed circuit board (PCB). A first hinge 126A connects the right corner 110A to a first temple 125A of the eyewear device 100. In some examples, components of the first camera 114A, the flexible PCB 140A, or other electrical connectors or contacts may be located on the first temple 125A or the first hinge 126A.

The right corner 110A includes corner body 190 and a corner cap, with the corner cap omitted in the cross-section of FIG. 1B. Disposed inside the right corner 110A are various interconnected circuit boards 109, such as the flexible PCB 140A, that include controller circuits for the first camera 114A, microphone(s) 139, speaker(s) 191, low-power wireless circuitry (e.g., for wireless short range network communication via Bluetooth™), high-speed wireless circuitry (e.g., for wireless local area network communication via Wi-Fi).

Figure 2A:
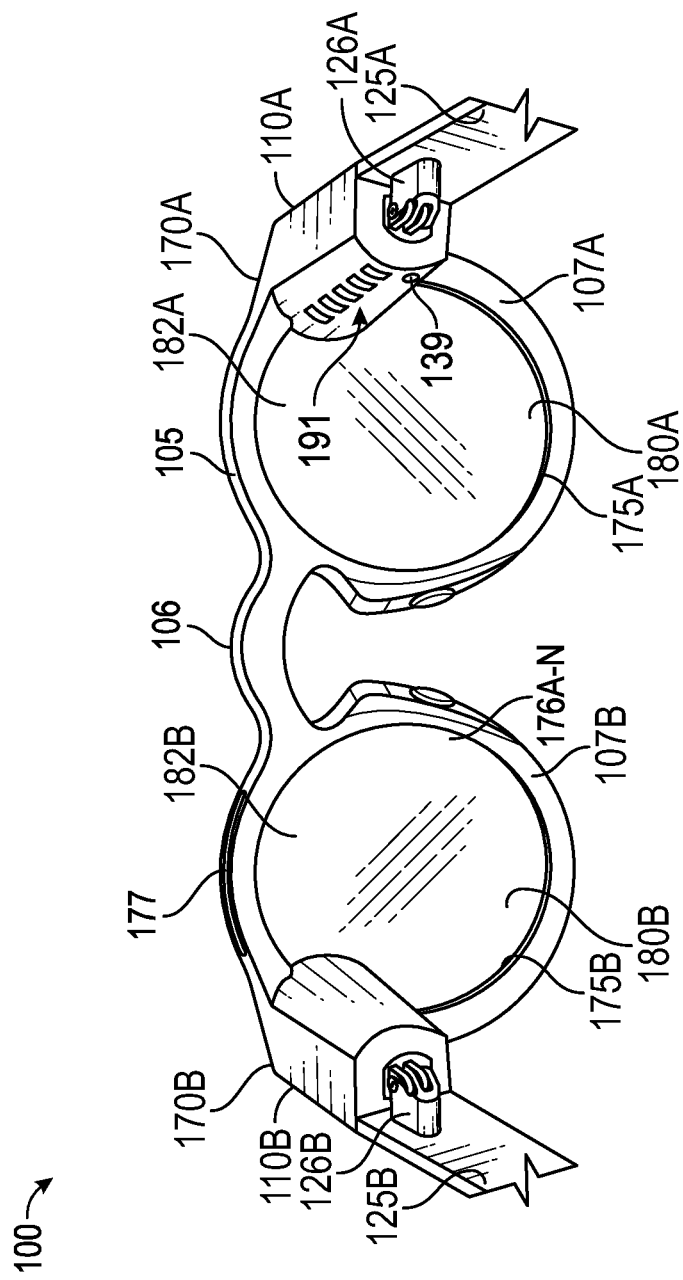
FIGS. 2A and 2B are rear views of an eyewear device utilized in an example IMU control system.

The first camera 114A is coupled to or disposed on the flexible PCB 140A and is covered by a camera cover lens, which is aimed through opening(s) formed in the frame 105. For example, the right rim 107A of the frame 105, shown in FIG. 2A, is connected to the right corner 110A and includes the opening(s) for the camera cover lens. The frame 105 includes a front side configured to face outward and away from the eye of the user. The opening for the camera cover lens is formed on and through the front or outward-facing side of the frame 105. In the example, the first camera 114A has an outward-facing field of view 111A (shown in FIG. 3) with a line of sight or perspective that is correlated with the right eye of the user of the eyewear device 100. The camera cover lens can also be adhered to a front side or outward-facing surface of the right corner 110A in which an opening is formed with an outward-facing angle of coverage, but in a different outwardly direction. The coupling can also be indirect via intervening components.

As shown in the example of FIG. 1D, the eyewear device 100 includes the second camera 114B and a circuit board 140B, which may be a flexible printed circuit board (PCB). A second hinge 126B connects the left corner 110B to a second temple 125B of the eyewear device 100. In some examples, components of the second camera 114B, the flexible PCB 140B, or other electrical connectors or contacts may be located on the second temple 125B or the second hinge 126B.

The left corner 110B includes corner body 190 and a corner cap, with the corner cap omitted in the cross-section of FIG. 1D. Disposed inside the right corner 110A are various interconnected circuit boards, such as the flexible PCB 140B, that include controller circuits for the second camera 114B.

The camera 114 are coupled to or disposed on respective flexible PCBs 140 and are covered by a camera cover lens, which is aimed through opening(s) formed in the frame 105. For example, as shown in FIG. 2A, the right rim 107A of the frame 105 is connected to the right corner 110A and includes the opening(s) for the camera cover lens and the left rim 107B of the frame 105 is connected to the left corner 110B and includes the opening(s) for the camera cover lens. The frame 105 includes a front side configured to face outward and away from the eye of the user. The opening for the camera cover lens is formed on and through the front or outward-facing side of the frame 105. In the example, the cameras 114 have respective outward-facing fields of view 111 (shown in FIG. 3) with a line of sight or perspective that is correlated with a respective eye of the user of the eyewear device 100. The camera cover lenses can also be adhered to a front side or outward-facing surface of the respective corners 110 in which an opening is formed with an outward-facing angle of coverage, but in a different outwardly direction. The coupling can also be indirect via intervening components.

Figure 2B:
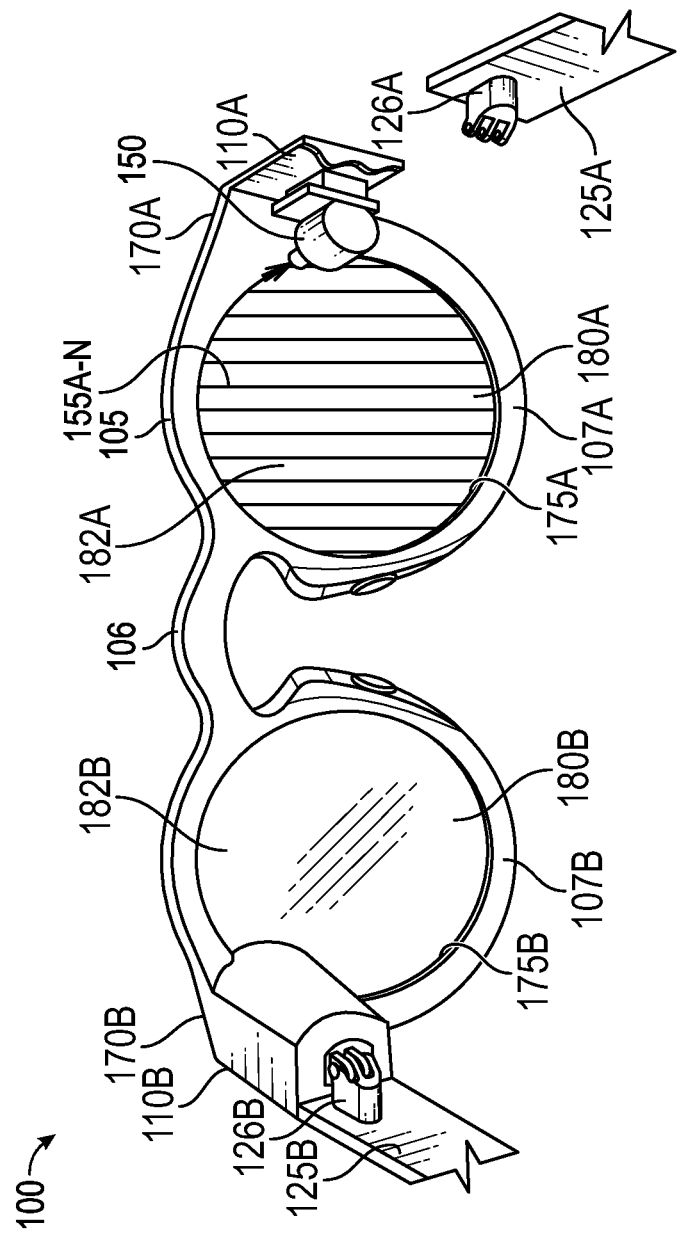

FIGS. 2A and 2B depict example hardware configurations of the eyewear device 100, including two different types of image displays. The eyewear device 100 is sized and shaped in a form configured for wearing by a user. The form of eyeglasses is shown in the illustrated examples. The eyewear device 100 can take other forms and may incorporate other types of frameworks; for example, a headgear, a headset, or a helmet.

In the eyeglasses example, eyewear device 100 includes a frame 105 including a right rim 107A connected to a left rim 107B via a bridge 106 configured to receive a nose of the user to support the eyewear device 100 on the user's head. The right rim 107A includes a first aperture 175A, which holds a first optical element 180A. The left rim 107B includes a second aperture 175B, which holds a second optical element 180B. As shown in FIG. 2B, each optical element 180A, 180B in some implementations includes an integrated image display (e.g., a first display 182A and a second display 182B). As used herein, the term "lens" is meant to include transparent or translucent pieces of glass or plastic having curved or flat surfaces that cause light to converge or diverge or that cause little or no convergence or divergence.

A touch-sensitive input device, such as a touchpad 181 is positioned on the first temple 125A. As shown, the touchpad 181 may have a boundary that is plainly visible or includes a raised or otherwise tactile edge that provides feedback to the user about the location and boundary of the touchpad 181; alternatively, the boundary may be subtle and not easily seen or felt. The eyewear device 100 may include a touchpad on the other side that operates independently or in conjunction with the touchpad 181.

The surface of the touchpad 181 is configured to detect finger touches, taps, and gestures (e.g., moving touches) for use with a graphical user interface (GUI) displayed by the eyewear device, on an image display, to allow the user to navigate through and select menu options in an intuitive manner, which enhances and simplifies the user experience.

Detection of finger inputs on the touchpad 181 can enable several functions. For example, touching anywhere on the touchpad 181 may cause the GUI to display or highlight an item on the image display, which may be projected onto at least one of the optical assemblies 180. Tapping or double tapping on the touchpad 181 may select an item or icon. Sliding or swiping a finger in a particular direction (e.g., from front to back, back to front, up to down, or down to) may cause the items or icons to slide or scroll in a particular direction; for example, to move to a next item, icon, video, image, page, or slide. Sliding the finger in another direction may slide or scroll in the opposite direction; for example, to move to a previous item, icon, video, image, page, or slide. The touchpad 181 can be positioned essentially anywhere on the eyewear device 100.

In one example, an identified finger gesture of a single tap on the touchpad 181, initiates selection or pressing of a GUI element in the image presented on the image display of the optical assembly 180. An adjustment to the image presented on the image display of the optical assembly 180 based on the identified finger gesture can be a primary action which selects or submits the GUI element on the image display of the optical assembly 180 for further display or execution.

FIG. 2A is an example hardware configuration for the eyewear device 100 in which the right corner 110A supports a microphone 139 and a speaker 191. The microphone 139 includes a transducer that converts sound into a corresponding electrical audio signal. The microphone 139 in the illustrated example is positioned with an opening that faces inward toward the wearer, to facilitate reception of the sound waves, such as human speech including verbal commands and questions. Additional or differently oriented openings may be implemented. In other example configurations, the eyewear device 100 is coupled to one or more microphones 139, configured to operate together or independently, and positioned at various locations on the eyewear device 100.

Figure 4:
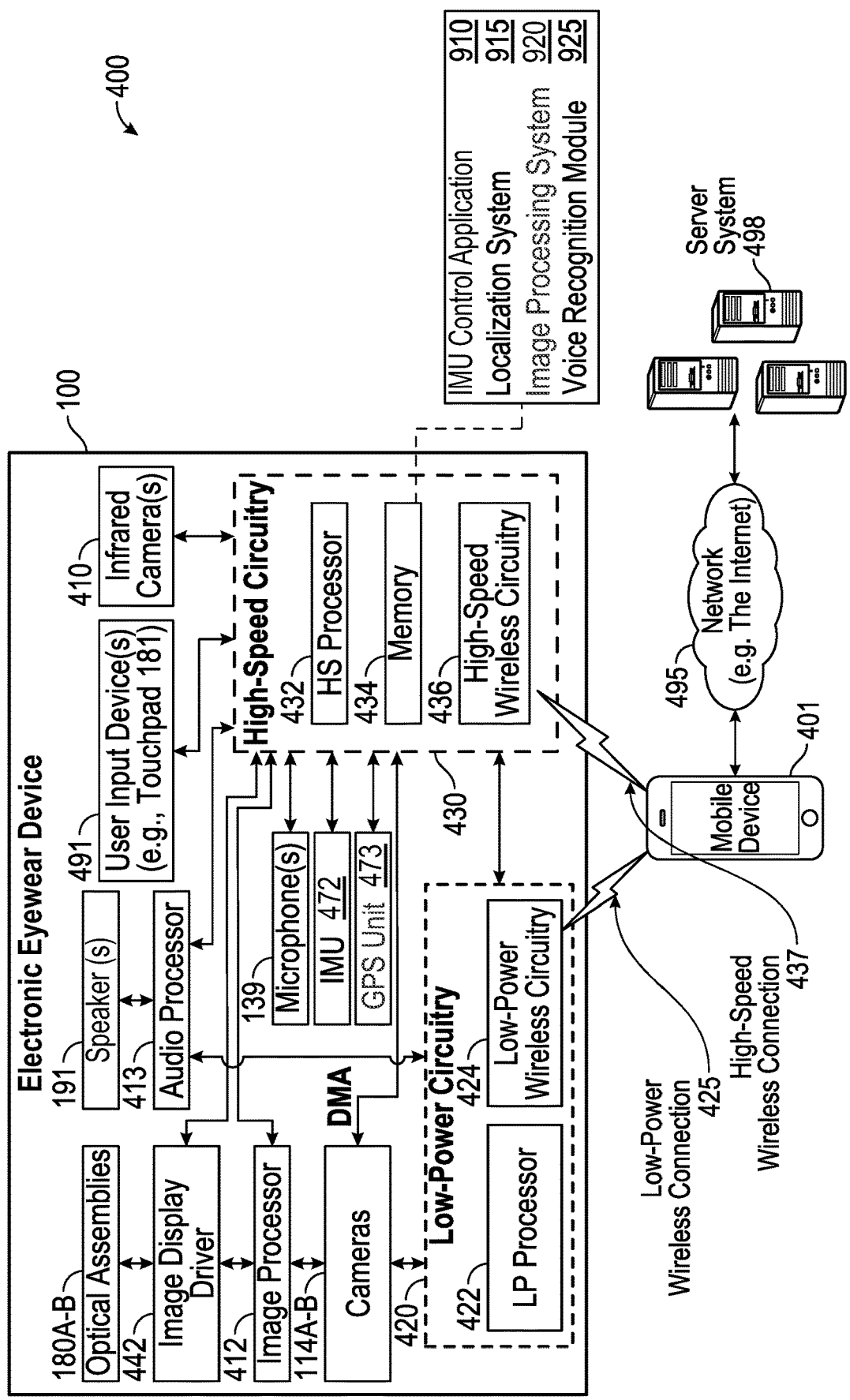
FIG. 4 is a functional block diagram of an example IMU control system including an eyewear device and a server system connected via various networks.

The speaker 191 includes an electro-acoustic transducer that converts an electrical audio signal into a corresponding sound. The speaker 191 is controlled by one of the processors 422, 432 or by an audio processor 413 (FIG. 4). The speaker 191 in this example includes a series of oblong apertures, as shown, that face inward to direct the sound toward the wearer. Additional or differently oriented apertures may be implemented. In other example configurations, the eyewear device 100 is coupled to one or more speakers 191, configured to operate together (e.g., in stereo, in zones to generate surround sound) or independently, and positioned at various locations on the eyewear device 100. For example, one or more speakers 191 may be incorporated into the frame 105, temples 125, or corners 110 of the eyewear device 100.

Although shown in FIG. 2A and FIG. 2B as having two optical elements 180, the eyewear device 100 can include other arrangements, such as a single optical element (or it may not include any optical element 180), depending on the application or the intended user of the eyewear device 100. As further shown, eyewear device 100 includes a right corner 110A adjacent the right lateral side 170A of the frame 105 and a left corner 110B adjacent the left lateral side 170B of the frame 105. The corners 110 may be integrated into the frame 105 on the respective sides 170 (as illustrated) or implemented as separate components attached to the frame 105 on the respective sides 170. Alternatively, the corners 110A, 110B may be integrated into temples (not shown) attached to the frame 105.

In one example, each image display of optical assembly 180 includes an integrated image display (e.g., a first display 182A and a second display 182B). As shown in FIG. 2A, each optical assembly 180 has a display 182 that includes a suitable display matrix 177, such as a liquid crystal display (LCD), an organic light-emitting diode (OLED) display, or other such display. Each optical assembly 180 also includes an optical layer or layers 176, which can include lenses, optical coatings, prisms, mirrors, waveguides, optical strips, and other optical components in any combination. The optical layers (shown as 176A-N in FIG. 2A) can include a prism having a suitable size and configuration and including a first surface for receiving light from a display matrix and a second surface for emitting light to the eye of the user. The prism of the optical layers 176A-N extends over all or at least a portion of the respective apertures 175 formed in the left and right rims 107 to permit the user to see the second surface of the prism when the eye of the user is viewing through the corresponding rims 107. The first surface of the prism of the optical layers 176A-N faces upwardly from the frame 105 and the display matrix 177 overlies the prism so that photons and light emitted by the display matrix 177 impinge the first surface. The prism is sized and shaped so that the light is refracted within the prism and is directed toward the eye of the user by the second surface of the prism of the optical layers 176A-N. In this regard, the second surface of the prism of the optical layers 176A-N can be convex to direct the light toward the center of the eye. The prism can optionally be sized and shaped to magnify the image projected by the display matrix 177, and the light travels through the prism so that the image viewed from the second surface is larger in one or more dimensions than the image emitted from the display matrix 177.

In one example, the optical layers 176A-N may include an LCD layer that is transparent (keeping the lens open) unless and until a voltage is applied which makes the layer opaque (closing or blocking the lens). The image processor 412 on the eyewear device 100 may execute programming to apply the voltage to the LCD layer in order to produce an active shutter system, making the eyewear device 100 suitable for viewing visual content when displayed as a 3D projection. Technologies other than LCD may be used for the active shutter mode, including other types of reactive layers that are responsive to a voltage or another type of input.

In another example, the image display device of optical assembly 180 has a display 182 that includes a projection image display as shown in FIG. 2B. Each optical assembly 180 includes a respective laser projector 150, such as a three-color laser projector using a scanning mirror or galvanometer. Each laser projector 150 is disposed in or on a respective temples 125 of the eyewear device 100. Each optical assembly 180, in this example, includes one or more optical strips (shown as 155A-N in FIG. 2B), which are spaced apart and across the width of the lens of each optical assembly 180 or across a depth of the lens between the front surface and the rear surface of the lens.

As the photons projected by the laser projector 150 travel across the lens of each optical assembly 180, the photons encounter the optical strips 155A-N. When a particular photon encounters a particular optical strip, the photon is either redirected toward the user's eye, or it passes to the next optical strip. A combination of modulation of laser projector 150, and modulation of optical strips, control specific photons or beams of light. In an example, a processor controls optical strips 155A-N by initiating mechanical, acoustic, or electromagnetic signals. Although shown as having two optical assemblies 180, the eyewear device 100 can include other arrangements, such as a single or three optical assemblies, or each optical assembly 180 may have different arrangements depending on the application or intended user of the eyewear device 100.

FIG. 3 is a diagrammatic depiction of a 3D scene 306, a first raw image 302A captured using a first camera 114A, and a second raw image 302B captured using a second camera 114B. The first field of view 111A may overlap, as shown, with the second field of view 111B. The overlapping fields of view 304 represents that portion of the image captured using both cameras 114. The term 'overlapping' when referring to field of view means the matrix of pixels in the generated raw images overlap by thirty percent (30%) or more. 'Substantially overlapping' means the matrix of pixels in the generated raw images—or in the infrared image of scene—overlap by fifty percent (50%) or more. As described herein, the two raw images 302 may be processed to include a timestamp, which allows the images to be displayed together as part of a three-dimensional projection.

For the capture of stereo images, as illustrated in FIG. 3, a pair of raw red, green, and blue (RGB) images are captured of a 3D scene 306 at a given moment in time—a first raw image 302A captured using the first camera 114A and a second raw image 302B captured using the second camera 114B. When the pair of raw images 302 are processed (e.g., by the image processor 412), depth images are generated. The generated depth images may be viewed on the optical assemblies 180 of an eyewear device, on another display (e.g., the image display 580 on a mobile device 401), or on a screen.

The generated depth images are in the three-dimensional space domain and can comprise a matrix of vertices on a three-dimensional location coordinate system that includes an X axis for horizontal position (e.g., length), a Y axis for vertical position (e.g., height), and a Z axis for depth (e.g., distance). Each vertex may include a color attribute (e.g., a red pixel light value, a green pixel light value, or a blue pixel light value); a position attribute (e.g., an X location coordinate, a Y location coordinate, and a Z location coordinate); a texture attribute; a reflectance attribute; or a combination thereof. The texture attribute quantifies the perceived texture of the depth image, such as the spatial arrangement of color or intensities in a region of vertices of the depth image.

FIG. 4 is a functional block diagram of an example IMU control system 400 that includes an eyewear device 100, a mobile device 401, and a server system 498 connected via various networks 495 such as the Internet. As shown, the IMU control system 400 includes a low-power wireless connection 425 and a high-speed wireless connection 437 between the eyewear device 100 and the mobile device 401.

The eyewear device 100 includes one or more cameras 114 that capture still images, video images, or both still and video images, as described herein. The cameras 114 may have a direct memory access (DMA) to high-speed circuitry 430 and function as a stereo camera. The cameras 114 may be used to capture initial-depth images that may be rendered into three-dimensional (3D) models that are texture-mapped images of a red, green, and blue (RGB) imaged scene. The device 100 may also include a depth sensor that uses infrared signals to estimate the position of objects relative to the device 100. The depth sensor in some examples includes one or more infrared emitter(s) and infrared camera(s) 410.

The eyewear device 100 further includes two image displays of optical assemblies 180 (one associated with the right side 170A and one associated with the left side 170B). The eyewear device 100 also includes an image display driver 442, an image processor 412, low-power circuitry 420, and high-speed circuitry 430. The image displays of optical assemblies 180 are for presenting images, including still images, video images, or still and video images. The image display driver 442 is coupled to the image displays of optical assemblies 180 in order to control the display of images.

The components shown in FIG. 4 for the eyewear device 100 are located on one or more circuit boards, for example a printed circuit board (PCB) or flexible printed circuit (FPC), located in the rims or temples. Alternatively, or additionally, the depicted components can be located in the corners, frames, hinges, or bridge of the eyewear device 100. The cameras 114 include digital camera elements such as a complementary metal-oxide-semiconductor (CMOS) image sensor, a charge-coupled device, a lens, or any other respective visible or light capturing elements that may be used to capture data, including still images or video of scenes with unknown objects.

As shown in FIG. 4, high-speed circuitry 430 includes a high-speed processor 432, a memory 434, and high-speed wireless circuitry 436. In the example, the image display driver 442 is coupled to the high-speed circuitry 430 and operated by the high-speed processor 432 in order to drive the image displays of optical assemblies 180. High-speed processor 432 may be essentially any processor capable of managing high-speed communications and operation of any general computing system. High-speed processor 432 includes processing resources needed for managing high-speed data transfers on high-speed wireless connection 437 to a wireless local area network (WLAN) using high-speed wireless circuitry 436.

In some examples, the high-speed processor 432 executes an operating system such as a LINUX operating system or other such operating system of the eyewear device 100 and the operating system is stored in memory 434 for execution. In addition to any other responsibilities, the high-speed processor 432 executes a software architecture for the eyewear device 100 that is used to manage data transfers with high-speed wireless circuitry 436. In some examples, high-speed wireless circuitry 436 is configured to implement Institute of Electrical and Electronic Engineers (IEEE) 802.11 communication standards, also referred to herein as Wi-Fi. In other examples, other high-speed communications standards may be implemented by high-speed wireless circuitry 436.

The low-power circuitry 420 includes a low-power processor 422 and low-power wireless circuitry 424. The low-power wireless circuitry 424 and the high-speed wireless circuitry 436 of the eyewear device 100 can include short-range transceivers (Bluetooth™ or Bluetooth Low-Energy (BLE)) and wireless wide, local, or wide-area network transceivers (e.g., cellular or Wi-Fi). Mobile device 401, including the transceivers communicating via the low-power wireless connection 425 and the high-speed wireless connection 437, may be implemented using details of the architecture of the eyewear device 100, as can other elements of the network 495.

Memory 434 includes any storage device capable of storing various data and applications, including, among other things, camera data generated by the cameras 114A, 114B, the infrared camera(s) 410, the image processor 412, and images generated for display by the image display driver 442 on the image display of each optical assembly 180. Although the memory 434 is shown as integrated with high-speed circuitry 430, the memory 434 in other examples may be an independent, standalone element of the eyewear device 100. In some such examples, electrical routing lines may provide a connection through a chip that includes the high-speed processor 432 from the image processor 412 or low-power processor 422 to the memory 434. In other examples, the high-speed processor 432 may manage addressing of memory 434 such that the low-power processor 422 will boot the high-speed processor 432 any time that a read or write operation involving memory 434 is to be performed.

As shown in FIG. 4, various elements of the eyewear device 100 can be coupled to the low-power circuitry 420, high-speed circuitry 430, or both. For example, the infrared camera 410 (including in some implementations an infrared emitter), the user input elements 491 (e.g., a button switch, a touchpad 181, a microphone 139), and the inertial measurement unit (IMU) 472 may be coupled to the low-power circuitry 420, high-speed circuitry 430, or both.

Figure 5:
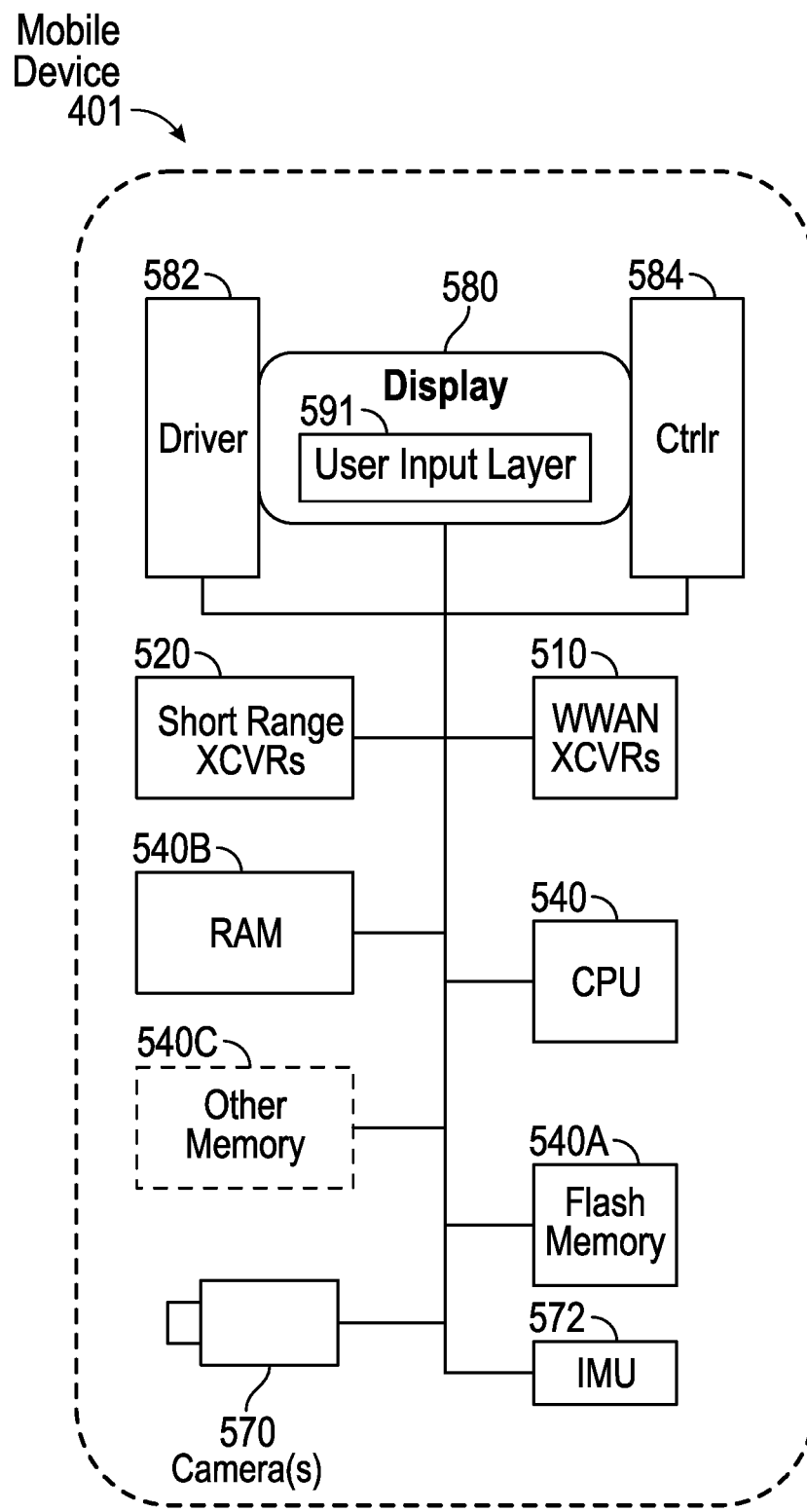
FIG. 5 is a diagrammatic representation of an example hardware configuration for a mobile device configured for use in the example IMU control system of FIG. 4.

As shown in FIG. 5, which is discussed if further detail below, the CPU 540 of the mobile device 401 may be coupled to a camera system 570, a mobile display driver 582, a user input layer 591, and a memory 540A.

The server system 498 may be one or more computing devices as part of a service or network computing system, for example, that include a processor, a memory, and network communication interface to communicate over the network 495 with an eyewear device 100 and a mobile device 401.

The output components of the eyewear device 100 include visual elements, such as the image displays associated with each lens or optical assembly 180 as described with reference to FIGS. 2A and 2B (e.g., a display such as a liquid crystal display (LCD), a plasma display panel (PDP), a light emitting diode (LED) display, a projector, or a waveguide). The eyewear device 100 may include a user-facing indicator (e.g., an LED, a speaker 191, or a vibrating actuator), or an outward-facing signal (e.g., an LED, a speaker 191). The image displays of each optical assembly 180 are driven by the image display driver 442. In some example configurations, the output components of the eyewear device 100 further include additional indicators such as audible elements (e.g., speakers 191), tactile components (e.g., an actuator such as a vibratory motor to generate haptic feedback), and other signal generators. For example, the device 100 may include a user-facing set of indicators, and an outward-facing set of signals. The user-facing set of indicators are configured to be seen or otherwise sensed by the user of the device 100. For example, the device 100 may include an LED display positioned so the user can see it, one or more speakers 191 positioned to generate a sound the user can hear, or an actuator to provide haptic feedback the user can feel. The outward-facing set of signals are configured to be seen or otherwise sensed by an observer near the device 100. Similarly, the device 100 may include an LED, a speaker 191, or an actuator that is configured and positioned to be sensed by an observer.

The user input elements 491 of the eyewear device 100 may include alphanumeric input components (e.g., a touch screen or touchpad 181 configured to receive alphanumeric input, a photo-optical keyboard, or other alphanumeric-configured elements), pointer-based input components (e.g., a mouse, a touchpad 181, a trackball, a joystick, a motion sensor, or other pointing instruments), tactile input components (e.g., a button switch, a touch screen or touchpad 181 that senses the location, force or location and force of touches or touch gestures, or other tactile-configured elements), and audio input components (e.g., a microphone 139), and the like. The mobile device 401 and the server system 498 may include alphanumeric, pointer-based, tactile, audio, and other input components.

In some examples, the eyewear device 100 includes a collection of motion-sensing components referred to as an IMU 472. The motion-sensing components may be microelectro-mechanical systems (MEMS) with microscopic moving parts, often small enough to be part of a microchip. The IMU 472 in some example configurations includes an accelerometer, a gyroscope, and a magnetometer. The accelerometer senses the linear acceleration of the device 100 (including the acceleration due to gravity) relative to three orthogonal axes (x, y, z). The gyroscope senses the angular velocity of the device 100 about three axes of rotation (pitch, roll, yaw). Together, the accelerometer and gyroscope can provide position, orientation, and motion data about the device relative to six axes (x, y, z, pitch, roll, yaw). The magnetometer, if present, senses the heading of the device 100 relative to magnetic north. The position of the device 100 may be determined by location sensors, such as a GPS unit 473, one or more transceivers to generate relative position coordinates, altitude sensors or barometers, and other orientation sensors. Such positioning system coordinates can also be received over the wireless connections 425, 437 from the mobile device 401 via the low-power wireless circuitry 424 or the high-speed wireless circuitry 436.

The IMU 472 may include or cooperate with a digital motion processor or programming that gathers the raw data from the components and compute a number of useful values about the position, orientation, and motion of the device 100. For example, the acceleration data gathered from the accelerometer can be integrated to obtain the velocity relative to each axis (x, y, z); and integrated again to obtain the position of the device 100 (in linear coordinates, x, y, and z). The angular velocity data from the gyroscope can be integrated to obtain the position of the device 100 (in spherical coordinates). The programming for computing these useful values may be stored in memory 434 and executed by the high-speed processor 432 of the eyewear device 100.

The eyewear device 100 may optionally include additional peripheral sensors, such as biometric sensors, specialty sensors, or display elements integrated with eyewear device 100. For example, peripheral device elements may include any I/O components including output components, motion components, position components, or any other such elements described herein. For example, the biometric sensors may include components to detect expressions (e.g., hand expressions, facial expressions, vocal expressions, body gestures, or eye tracking), to measure bio signals (e.g., blood pressure, heart rate, body temperature, perspiration, or brain waves), or to identify a person (e.g., identification based on voice, retina, facial characteristics, fingerprints, or electrical bio signals such as electroencephalogram data), and the like.

The mobile device 401 may be a smartphone, tablet, laptop computer, access point, or any other such device capable of connecting with eyewear device 100 using both a low-power wireless connection 425 and a high-speed wireless connection 437. Mobile device 401 is connected to server system 498 and network 495. The network 495 may include any combination of wired and wireless connections.

The IMU control system 400, as shown in FIG. 4, includes a computing device, such as a portable electronic device 401 (e.g., a mobile device), coupled to an eyewear device 100 over a network 495. The IMU control system 400 includes a memory (e.g., a non-transitory computer readable media) for storing instructions and a processor for executing the instructions. In some implementations, the memory and processing functions of the IMU control system 400 can be shared or distributed across the processors and memories of an eyewear device 100, a portable electronic device 401 (e.g., a mobile device), and/or a server system 498.

In some implementations, the IMU control system 400 includes one or more elements or modules, referred to herein as a IMU control application 910, a localization system 915, an image processing system 920, and a voice recognition module 925.

The IMU control application 910 in some implementations renders and presents a virtual rotational interface 800 on a display, as described herein.

The localization system 915 in some implementations obtains localization data for use in determining the current position of a portable electronic device 401 (e.g., a mobile phone) or an electronic eyewear device 100 relative to a physical environment 600. For example, the localization system 915 may access the frames of video data 900 captured using the camera 114B to determine the current eyewear device location 840 in three-dimensional coordinates relative to the physical environment 600 (with or without reference to data from other sources, such as an inertial measurement unit or IMU 472). As used herein, the term 'frames of video data' refers to the video motion data captured using the one or more cameras 114A, 114B coupled to the eyewear device 100, including images, spatial data, and related information captured using essentially any sensor component of a camera in any form and at any sample rate. In some implementations, the localization data may be derived from the frames of motion data captured using the IMU 472, from data gathered by a GPS unit 473, or from a combination thereof.

The image processing system 920 in some implementations generates and presents a virtual rotational interface 800, as described herein, on the display of a portable electronic device 401 (e.g., a mobile phone) or an electronic eyewear device 100, in cooperation with the image display driver 442 and the image processor 412. The virtual rotational interface 800 in some implementations includes one or more virtual surfaces each of which is virtually presented at a surface position 810 in the physical environment 600 relative to the display.

The voice recognition module 925 in some implementations receives human speech, converts the received speech into frames of audio data, identifies an inquiry or a request based on the audio data, and executes an action that is correlated with and responsive to the identified inquiry or request.

FIG. 5 is a high-level functional block diagram of an example mobile device 401. Mobile device 401 includes a flash memory 540A which stores programming to be executed by the CPU 540 to perform all or a subset of the functions described herein.

The mobile device 401 may include a camera 570 that comprises at least two cameras (e.g., first and second visible-light cameras with overlapping fields of view) or at least one camera and a depth sensor with substantially overlapping fields of view. Flash memory 540A may further include multiple images or video, which are generated via the camera 570.

As shown, the mobile device 401 includes an image display 580, a mobile display driver 582 to control the image display 580, and a display controller 584. In the example of FIG. the image display 580 includes a user input layer 591 (e.g., a touchscreen) that is layered on top of or otherwise integrated into the screen used by the image display 580.

Examples of touchscreen-type mobile devices that may be used include (but are not limited to) a smart phone, a personal digital assistant (PDA), a tablet computer, a laptop computer, or other portable device. However, the structure and operation of the touchscreen-type devices is provided by way of example; the subject technology as described herein is not intended to be limited thereto. For purposes of this discussion, FIG. 5 therefore provides a block diagram illustration of the example mobile device 401 with a user interface that includes a touchscreen input layer 591 for receiving input (by touch, multi-touch, or gesture, and the like, by hand, stylus, or other tool) and an image display 580 for displaying content As shown in FIG. 5, the mobile device 401 includes at least one digital transceiver (XCVR) 510, shown as WWAN XCVRs, for digital wireless communications via a wide-area wireless mobile communication network. The mobile device 401 also includes additional digital or analog transceivers, such as short-range transceivers (XCVRs) 520 for short-range network communication, such as via NFC, VLC, DECT, ZigBee, Bluetooth™, or Wi-Fi. For example, short range XCVRs 520 may take the form of any available two-way wireless local area network (WLAN) transceiver of a type that is compatible with one or more standard protocols of communication implemented in wireless local area networks, such as one of the Wi-Fi standards under IEEE 802.11.

To generate location coordinates for positioning of the mobile device 401, the mobile device 401 can include a global positioning system (GPS) receiver. Alternatively, or additionally the mobile device 401 can utilize either or both the short range XCVRs 520 and WWAN XCVRs 510 for generating location coordinates for positioning. For example, cellular network, Wi-Fi, or Bluetooth™ based positioning systems can generate accurate location coordinates, particularly when used in combination. Such location coordinates can be transmitted to the eyewear device over one or more network connections via XCVRs 510, 520.

The mobile device 401 in some examples includes a collection of motion-sensing components referred to as an inertial measurement unit (IMU) 572 for sensing the position, orientation, and motion of the mobile device 401. The motion-sensing components may be micro-electro-mechanical systems (MEMS) with microscopic moving parts, often small enough to be part of a microchip. The inertial measurement unit (IMU) 572 in some example configurations includes an accelerometer, a gyroscope, and a magnetometer. The accelerometer senses the linear acceleration of the mobile device 401 (including the acceleration due to gravity) relative to three orthogonal axes (x, y, z). The gyroscope senses the angular velocity of the mobile device 401 about three axes of rotation (pitch, roll, yaw). Together, the accelerometer and gyroscope can provide position, orientation, and motion data about the device relative to six degrees of freedom (x, y, z, pitch, roll, yaw) sometimes referred to as 6DOF. The magnetometer, if present, senses the heading of the mobile device 401 relative to magnetic north.

The IMU 572 may include or cooperate with a digital motion processor or programming that gathers the raw data from the components and compute a number of useful values about the position, orientation, and motion of the mobile device 401. For example, the acceleration data gathered from the accelerometer can be integrated to obtain the velocity relative to each axis (x, y, z); and integrated again to obtain the position of the mobile device 401 (in linear coordinates, x, y, and z). The angular velocity data from the gyroscope can be integrated to obtain the position of the mobile device 401 (in spherical coordinates). The programming for computing these useful values may be stored in on or more memory elements 540A, 540B, 540C and executed by the CPU 540 of the mobile device 401.

The transceivers 510, 520 (i.e., the network communication interface) conforms to one or more of the various digital wireless communication standards utilized by modern mobile networks. Examples of WWAN transceivers 510 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, the transceivers 510, 520 provide two-way wireless communication of information including digitized audio signals, still image and video signals, web page information for display as well as web-related inputs, and various types of mobile message communications to/from the mobile device 401.

The mobile device 401 further includes a microprocessor that functions as a central processing unit (CPU); shown as CPU 540 in FIG. 4. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The CPU 540, for example, may be based on any known or available microprocessor architecture, such as a Reduced Instruction Set Computing (RISC) using an ARM architecture, as commonly used today in mobile devices and other portable electronic devices. Of course, other arrangements of processor circuitry may be used to form the CPU 540 or processor hardware in smartphone, laptop computer, and tablet.

The CPU 540 serves as a programmable host controller for the mobile device 401 by configuring the mobile device 401 to perform various operations, for example, in accordance with instructions or programming executable by CPU 540. For example, such operations may include various general operations of the mobile device, as well as operations related to the programming for applications on the mobile device. Although a processor may be configured by use of hardwired logic, typical processors in mobile devices are general processing circuits configured by execution of programming.

The mobile device 401 includes a memory or storage system, for storing programming and data. In the example, the memory system may include a flash memory 540A, a random-access memory (RAM) 540B, and other memory components 540C, as needed. The RAM 540B serves as short-term storage for instructions and data being handled by the CPU 540, e.g., as a working data processing memory. The flash memory 540A typically provides longer-term storage.

Hence, in the example of mobile device 401, the flash memory 540A is used to store programming or instructions for execution by the CPU 540. Depending on the type of device, the mobile device 401 stores and runs a mobile operating system through which specific applications are executed. Examples of mobile operating systems include Google Android, Apple iOS (for iPhone or iPad devices), Windows Mobile, Amazon Fire OS, RIM BlackBerry OS, or the like.

The processor 432 within the eyewear device 100 may construct a map of the environment surrounding the eyewear device 100, determine a location of the eyewear device within the map of the environment, and determine a relative position of the eyewear device to one or more objects in the mapped environment. The processor 432 may construct the map and determine location and position information using a simultaneous localization and mapping (SLAM) algorithm applied to data received from one or more sensors. Sensor data includes images received from one or both of the cameras 114A, 114B, distance(s) received from a laser range finder, position information received from a GPS unit 473, motion and acceleration data received from an IMU 572, or a combination of data from such sensors, or from other sensors that provide data useful in determining positional information. In the context of augmented reality, a SLAM algorithm is used to construct and update a map of an environment, while simultaneously tracking and updating the location of a device (or a user) within the mapped environment. The mathematical solution can be approximated using various statistical methods, such as particle filters, Kalman filters, extended Kalman filters, and covariance intersection. In a system that includes a high-definition (HD) video camera that captures video at a high frame rate (e.g., thirty frames per second), the SLAM algorithm updates the map and the location of objects at least as frequently as the frame rate; in other words, calculating and updating the mapping and localization thirty times per second.

Sensor data includes image(s) received from one or both cameras 114A, 114B, distance(s) received from a laser range finder, position information received from a GPS unit 473, motion and acceleration data received from an IMU 472, or a combination of data from such sensors, or from other sensors that provide data useful in determining positional information.

Figure 6:
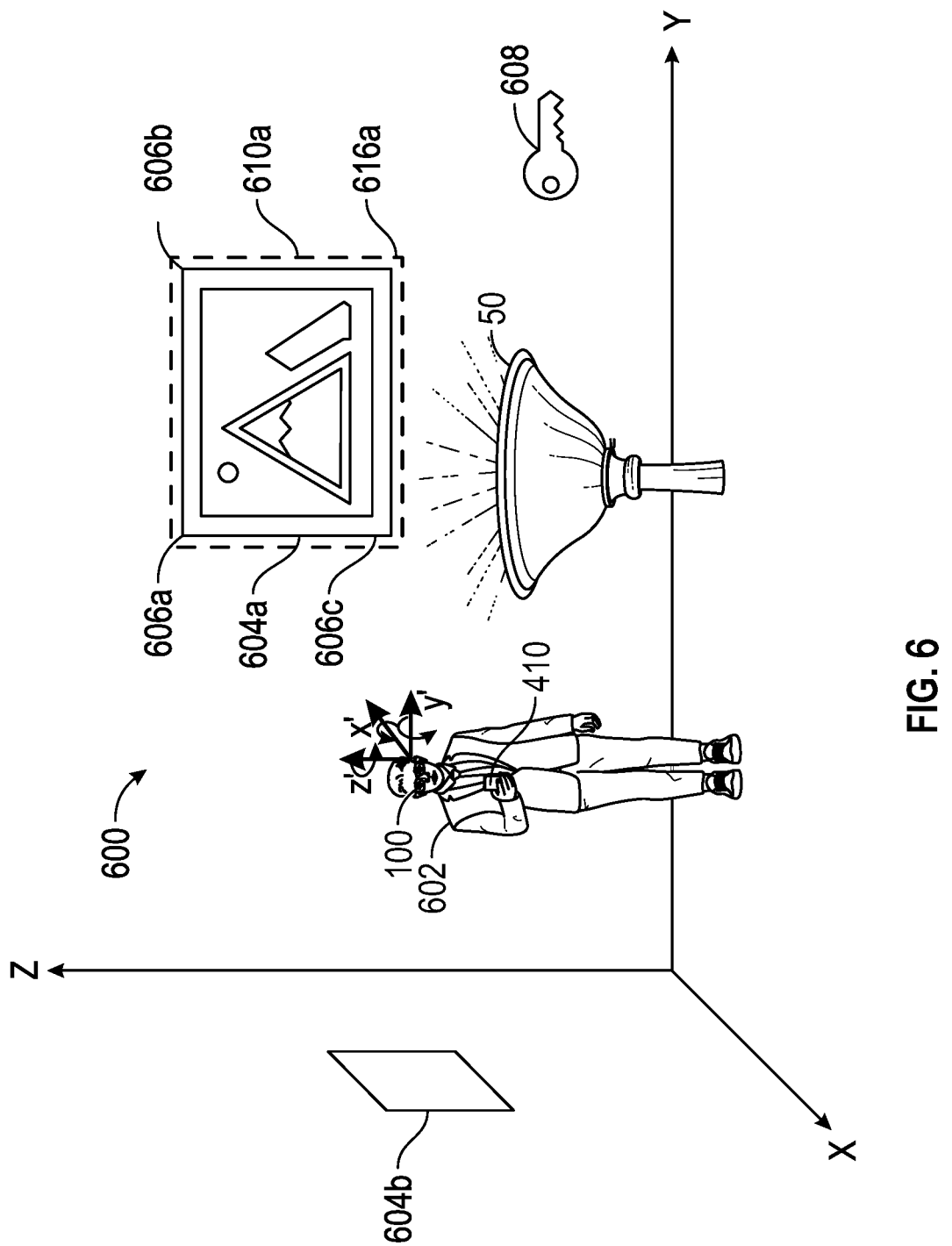
FIG. 6 is a perspective view of a user in an example environment, including physical objects and virtual objects, for reference in describing an example process known as simultaneous localization and mapping (SLAM)

FIG. 6 depicts an example physical environment 600 along with elements that are useful when using a SLAM algorithm (Simultaneous Localization and Mapping) and other types of tracking applications (e.g., natural feature tracking (NFT), hand tracking, foot tracking, etc.). A user 602 of a portable electronic device 401 (e.g., a mobile phone) and an electronic eyewear device 100 is present in an example physical environment 600 (which, in FIG. 6, is an interior room). The processor 432 of the eyewear device 100 (or the processor of the mobile phone 401) determines the position of the electronic device 100, 401 with respect to one or more physical objects 604 (e.g., including IoT objects 50) within the environment 600 using captured image data, constructs a map of the environment 600 using a coordinate system (e.g., a Cartesian coordinate system (x, y, z)) for the environment 600, and determines the position of the device 100, 410 relative to the coordinate system. Additionally, the processor in some implementations determines a precise orientation and location (x-prime, y-prime, z-prime, roll, pitch, and yaw) of the portable electronic device 401 or the eyewear device 100 within the environment by using two or more location points (e.g., three location points 606a, 606b, and 606c) associated with a single object 604a, or by using one or more location points 606 associated with two or more objects 604a, 604b, 604c. An application on the portable electronic device 401 or the eyewear device 100 may present a virtual object 608 (such as the key shown in FIG. 6) within the environment 600 for viewing on a display during an augmented reality experience.

The localization system 915 in some examples includes a virtual marker 610a associated with a virtual object 608 in the physical environment 600. In an augmented reality environment, in some implementations, markers are registered at locations in the physical environment 600 to assist electronic devices with the task of tracking and updating the location of users, devices, and objects (virtual and physical) relative to the physical environment. Markers are sometimes registered to a high-contrast physical object, such as the relatively dark object, such as the framed picture 604a, mounted on a lighter-colored wall, to assist cameras and other sensors with the task of detecting the marker. The markers may be assigned and registered in a memory by the eyewear device 100 operating within the environment. In some implementations, the markers are assigned and registered in the memory of other devices in the network.

The localization system 915 tracks physical objects and virtual objects within the physical environment 600 relative to the eyewear device 100. For a physical object 604 (e.g., the example floor safe 604c, the example IoT object 50) the localization system 915 continuously analyzes captured images of the physical environment 600 to identify the object 604 and to determine its location relative to the eyewear device 100 (e.g., by applying a SLAM algorithm). The localization system 915 maintains and updates the determined location information for the physical object 604 in memory, thereby tracking the physical object 604 as the eyewear device 100 if and when it moves through the physical environment 600. For a virtual object 608 (e.g., key) the localization system 915 establishes or designates an initial location for the virtual object 608 corresponding to a location or a physical object 604 in the environment 600 (or, in some implementations, at a location relative to the eyewear device 100). The localization system 915 maintains and updates the virtual object 608 location information, for example, in accordance with a movement algorithm associated with the virtual object 608, in response to movement of the eyewear device 100 through the environment, or a combination thereof, thereby tracking the virtual object 608 as the eyewear device 100 moves through the environment.

Markers can be encoded with or otherwise linked to information. A marker might include position information, a physical code (such as a bar code or a QR code; either visible to the user or hidden), or a combination thereof. A set of data associated with the marker is stored in the memory 434 of the eyewear device 100. The set of data includes information about the marker 610a, the marker's position (location and orientation), one or more virtual objects, or a combination thereof. The marker position may include three-dimensional coordinates for one or more marker landmarks 616a, such as the corner of the generally rectangular marker 610a shown in FIG. 6. The marker location may be expressed relative to real-world geographic coordinates, a system of marker coordinates, a position of the eyewear device 100, or other coordinate system. The one or more virtual objects associated with the marker 610a may include any of a variety of materials, including still images, video, audio, tactile feedback, executable applications, interactive user interfaces and experiences, and combinations or sequences of such material. Any type of content capable of being stored in a memory and retrieved when the marker 610a is encountered or associated with an assigned marker may be classified as a virtual object in this context. The virtual key 608 shown in FIG. 6, for example, is a virtual object displayed as a still image, either 2D or 3D, at a marker location.

In one example, the marker 610a may be registered in memory as being located near and associated with a physical object 604a (e.g., the framed work of art shown in FIG. 6). In another example, the marker may be registered in memory as being a particular position with respect to the eyewear device 100.

Figure 7:
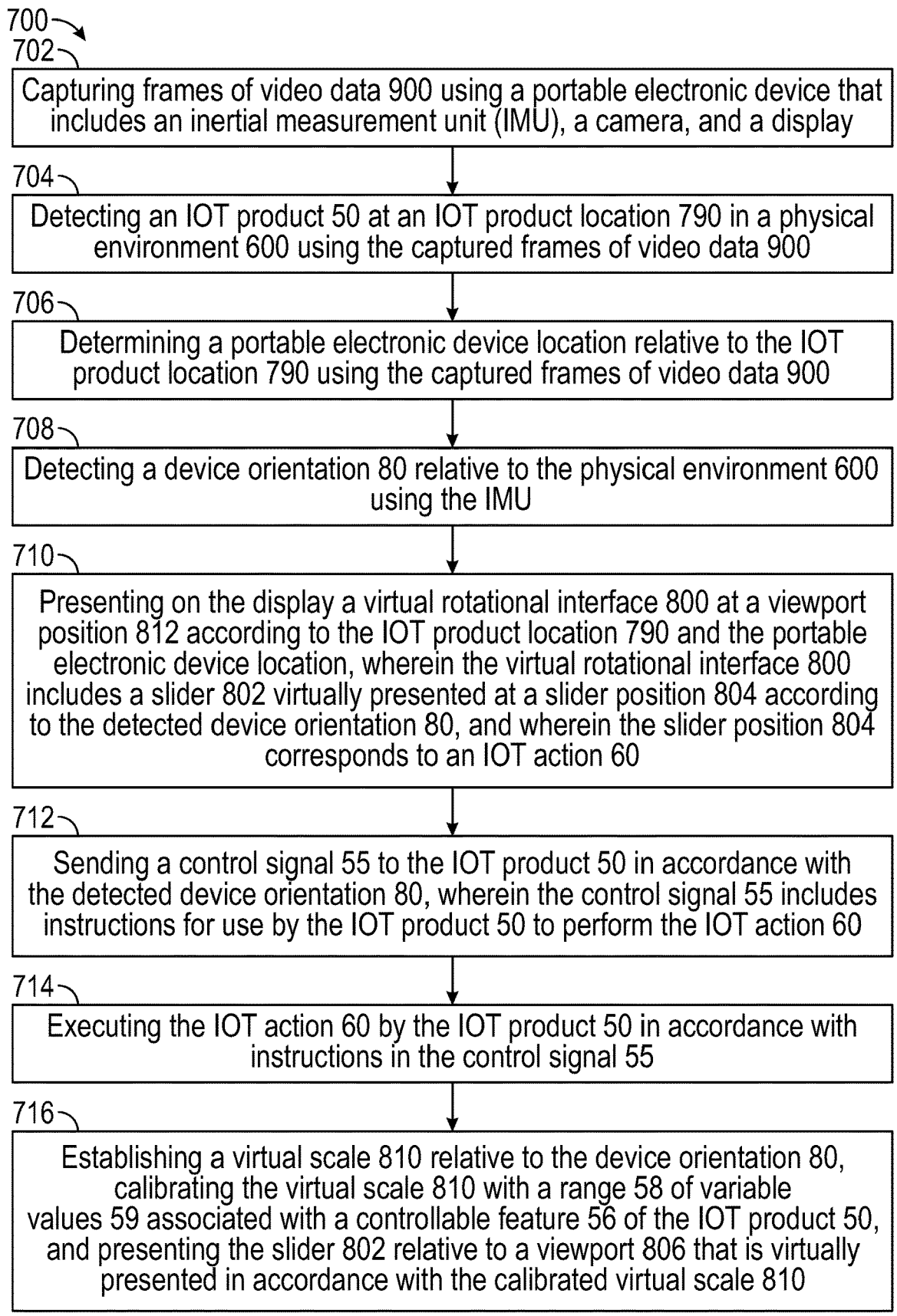
FIG. 7 is a flow chart listing the steps in an example method of presenting a virtual rotational interface on a display.

FIG. 7 is a flow chart 700 of an example method of controlling an IoT product 50 using a portable electronic device 401. Although the steps are described with reference to the portable electronic device 401 (e.g., a mobile phone) or the eyewear device 100 described herein, other implementations of the steps described, for other types of devices, will be understood by one of skill in the art from the description herein. One or more of the steps shown and described may be performed simultaneously, in a series, in an order other than shown and described, or in conjunction with additional steps. Some steps may be omitted or, in some applications, repeated.

The IMU control application 910 described herein, in some implementations, launches in response to receiving a selection through a user interface (e.g., selecting from a menu, pressing a button, using a touchpad) or through some other input means (e.g., a hand gesture detected in captured images, a finger touch 681 on the touchpad 181, a voice command).

In some implementations, an IoT product 50 (e.g., a lamp, a speaker, a fan) is paired with a portable electronic device 401 or an electronic eyewear device 100. Some IoT products 50 include an application programming interface (API) (e.g., a product API 52) that allows the IoT product 50 to pair with and otherwise communicate with other products and electronic devices, such as portable electronic devices 401 and electronic eyewear devices 100. In some implementations, the product API 52 includes information such as a product type 54 (e.g., lamp, speaker, fan) and, in some implementations, a list of the one or more controllable features 56 (e.g., on, off, brightness, color temperature, hue, volume, speed) associated with the IoT product 50.

Figure 8A:
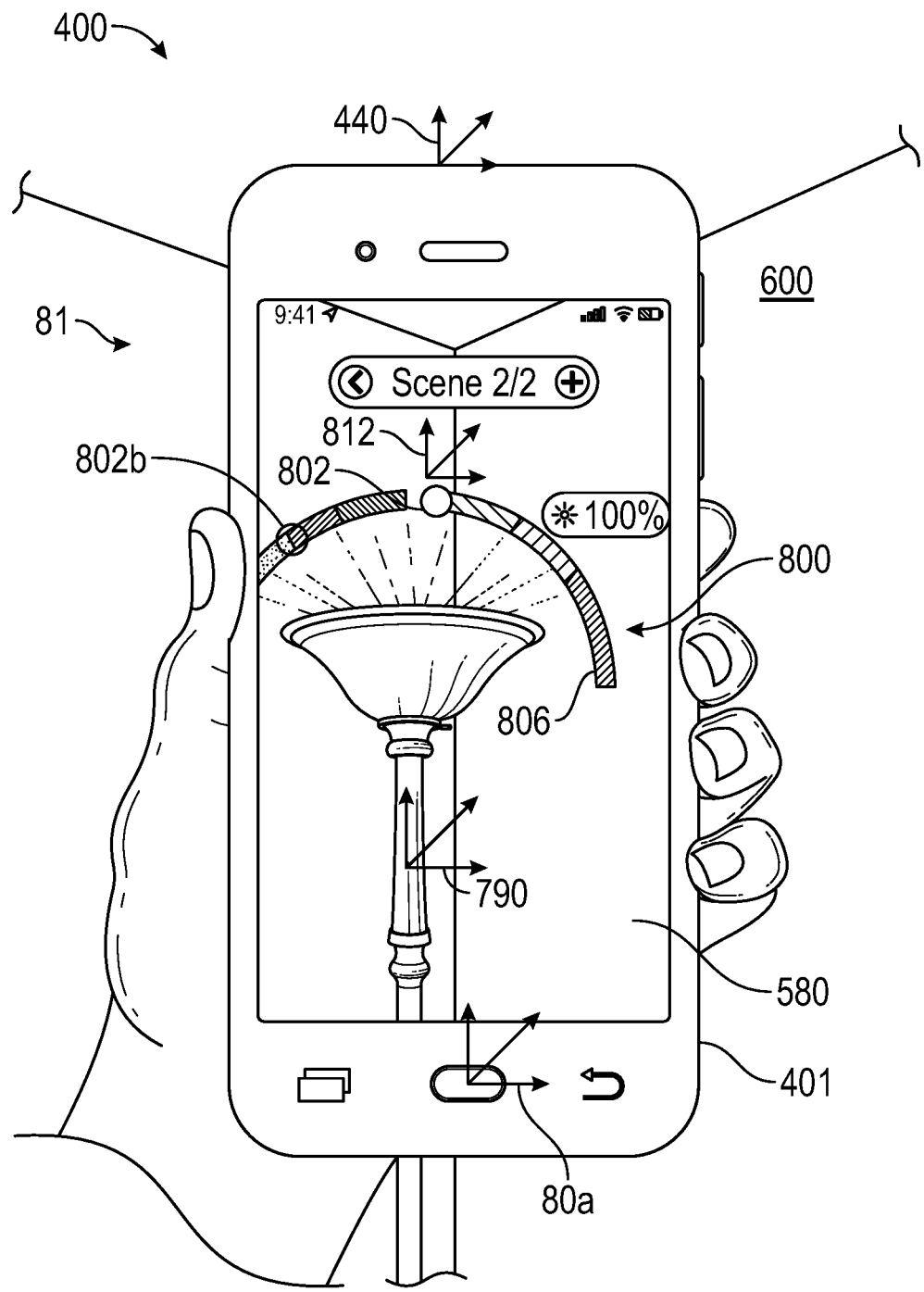
FIG. 8A is an illustration of an example virtual rotational interface presented on the display of a portable electronic device.

FIG. 8A is an illustration of an example virtual rotational interface 800 presented on the display 580 of a portable electronic device 401. In this example, the IoT product 50 is a lamp, as shown. The IoT product 50 is present and observable, of course, in the physical environment 600. The virtual rotational interface 800 is observable when presented on the display 580 by the IMU control application 910 described herein.

The IMU control application 910 in some implementations controls the process of pairing the IoT product 50 with the portable electronic device 410. The process of pairing in some implementations uses the product API 52. In some implementations, the IoT product 50 includes an associated product API 52 which includes a product type 54 (e.g., "lamp") and a list of the one or more controllable features 56 (e.g., brightness, color temperature, hue).

Figure 8B:
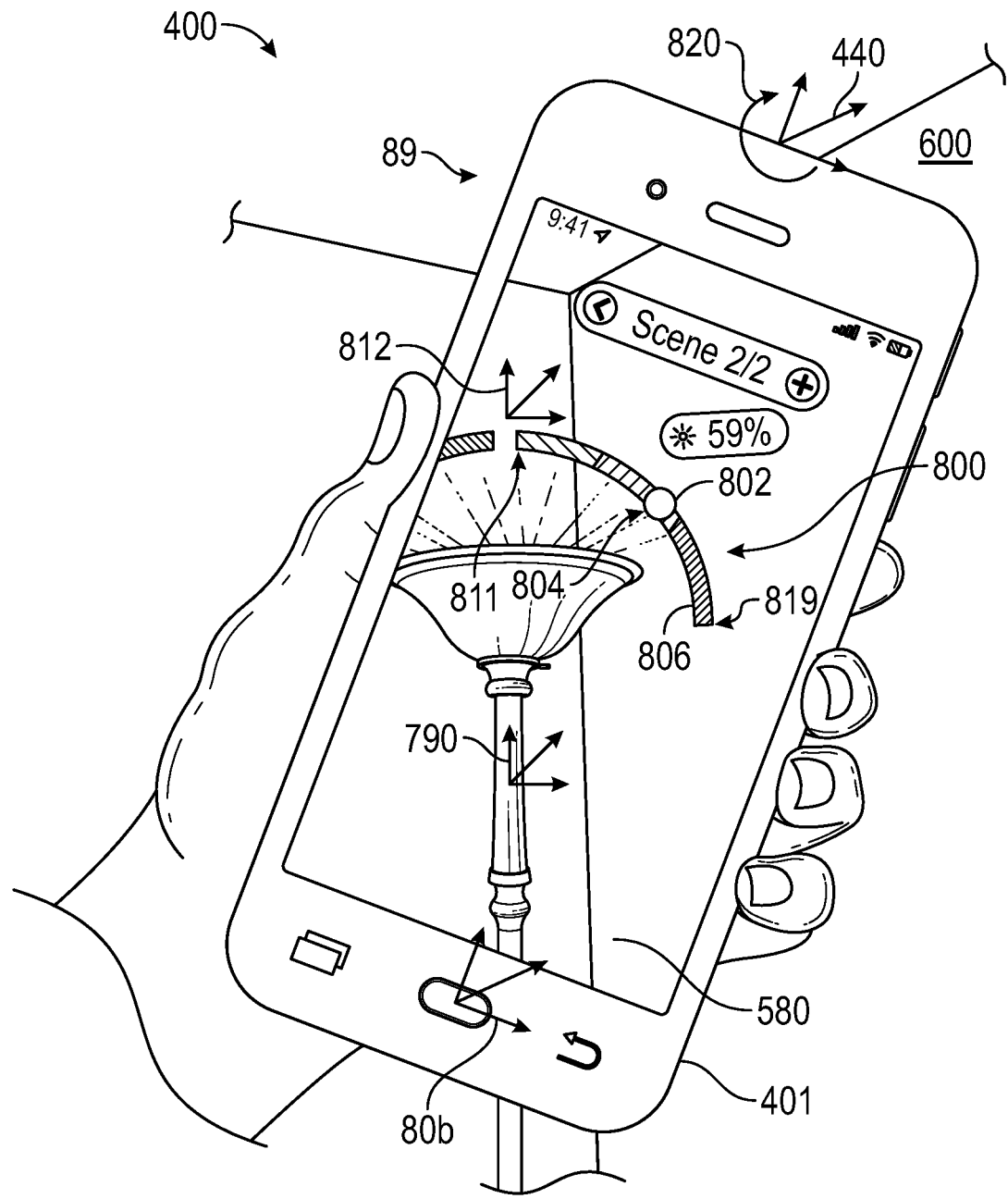
FIG. 8B is an illustration of an example interaction between the portable electronic device and the virtual rotational interface of FIG. 8A, resulting in a corresponding IoT action.

FIG. 8B is an illustration of an example interaction between the portable electronic device 401 and the virtual rotational interface 800 of FIG. 8A, resulting in a corresponding IoT action 60 (e.g., decreasing the brightness of the lamp).

Figure 9:
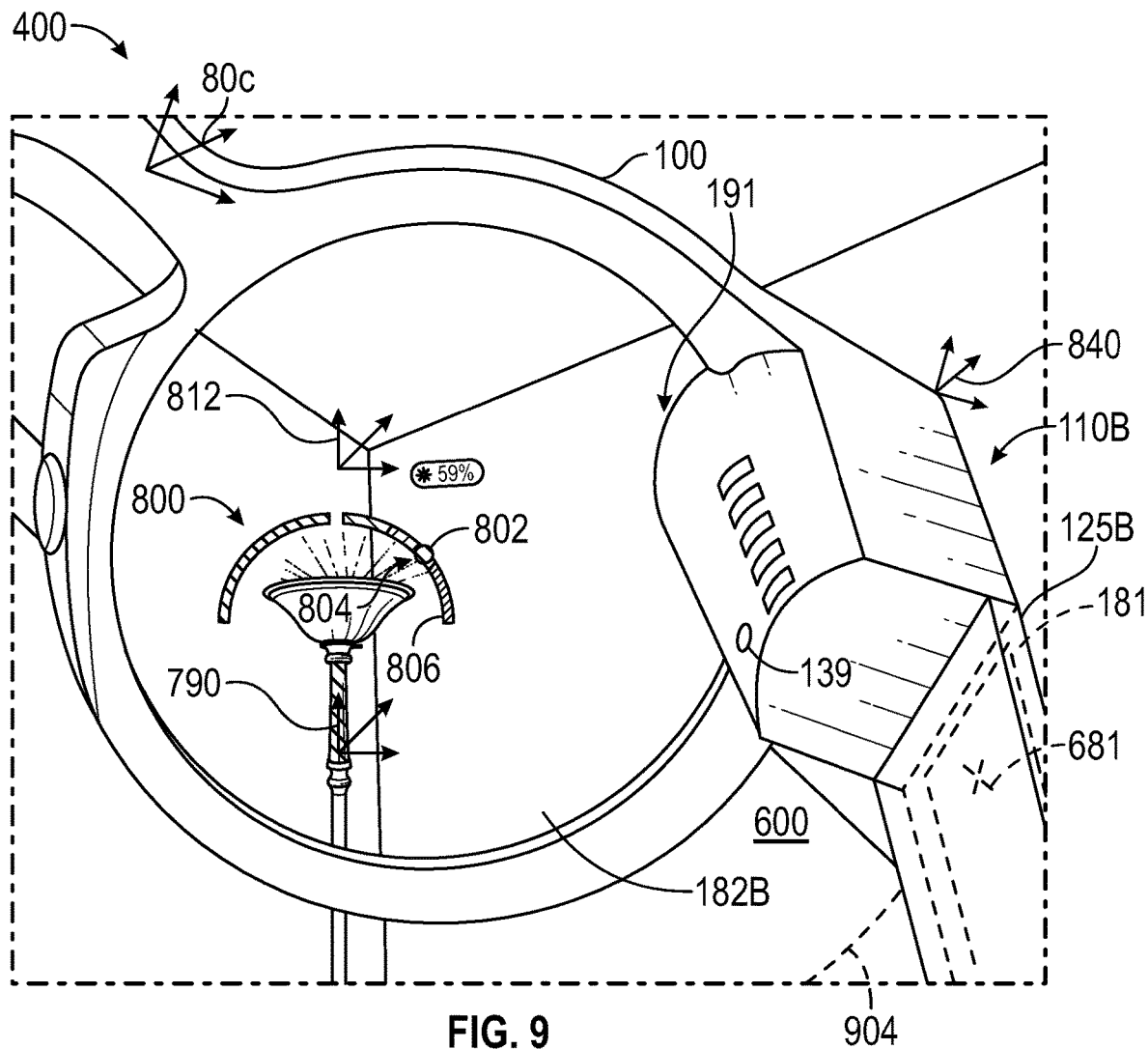
FIG. 9 is an illustration of an example interaction between a portable electronic device and an example virtual rotational interface presented on the display of an electronic eyewear device.

FIG. 9 is an illustration of an example interaction between a portable electronic device 401 and an example virtual rotational interface 800 presented on the display 182B of an electronic eyewear device 100. The eyewear device 100 in some implementations includes a voice recognition module 925, as described herein, and a microphone 139 coupled to a speaker 191. The voice recognition module 925 in some implementations configures the processor 432 to perceive human speech, convert the received speech into frames of audio data, identify a first inquiry based on converted frames of audio data, and then perform an action in response to and in accordance with the identified first inquiry. For example, the human speech may include a verbal command (e.g., "show virtual rotational interface") and, in response, the identified first inquiry causes the IMU control application 910 to present a virtual rotational interface 800 on the display.

In some implementations, an IoT product 50 does not include an API. An IoT product 50 is typically connected to the internet or to other products in a network. Because of this connectivity, the communications between and among IoT products 50 generally includes data or information indicating the product type 54 (e.g., lamp, speaker, fan). In this aspect, the product type 54 is generally known, even when the IoT product 50 does not include a product API 52. In some implementations, the IMU control application 910 described herein includes an inference engine that is configured to infer a set of probable controllable features 56 associated with an IoT product 50 based on the product type 54 alone. For example, an IoT product 50 may be sharing data that indicates the product type 54 is "speaker." The inference engine, in some implementations, will infer a set of probable controllable features 56 (e.g., on, off, variable volume, list of available nature sounds) because such features are generally associated with a particular product type (e.g., a speaker or sound system). For another example, when the product type 54 is a "fan," the inference engine, in some implementations, will infer a set of probable controllable features 56 (e.g., an on-off toggle switch for power, a variable fan speed (from a minimum to a maximum), a set of predefined fan speeds (low, medium, high), an on-off toggle switch for oscillating (still or moving), and the like). When the product type 54 is an "LED lamp," the inference engine, in some implementations, will infer a set of probable controllable features 56 (e.g., an on-off toggle switch for power, a variable brightness (from a minimum to a maximum value), a variable color selection (in a continuous cycle of hues or colors), and the like).

Block 702 in FIG. 7 recites an example step of capturing frames of video data 900 with the camera 570 of a portable electronic device 401. In some implementations, the process of capturing frames of video data 900 is ongoing during active use of the portable device 401. In other examples, the process of capturing starts in response to receiving a selection through a user interface or through some other input means. The example method step, at block 702, in some implementations, includes storing the captured frames of video data 900 in memory on the portable electronic device 401, at least temporarily, such that the frames of video data 900 are available for uses including processing and analysis.

Block 704 in FIG. 7 recites an example step of detecting an IoT product 50 at an IoT product location 790 in a physical environment 600 based on the captured frames of video data 900. As described herein, the IoT product 50 in some implementations is already paired with or otherwise in wireless communication with the portable electronic device 401. In this aspect, the process of detecting occurs when (and for as long as) the IoT product 50 is within a threshold proximity of the portable electronic device 401.

FIG. 8A illustrates an example IoT product 50 located in the physical environment 600 at an IoT product location 790.

In some implementations the process of detecting an IoT product 50 includes determining or estimating an IoT product location 790 relative to the physical environment 600. The current IoT product location 790 in some implementations is estimated using the localization system 915 as described herein.

The localization system 915 in some implementations configures the IMU control application 910 to obtain localization data based on the captured frames of video data 900 and, in some implementations, based on the motion data gathered by an inertial measurement unit (IMU). In some implementations, the localization system 915 constructs a virtual map of one or more objects within the camera field of view 904 using a SLAM algorithm, as described herein, updating the map and the location of objects at least as frequently as the camera captures video data 900.

The process of determining or estimating the IoT product location 790 relative to the physical environment 600 in some implementations includes calculating a correlation between the IoT product location 790 and the current portable electronic device location 440 (as shown in FIG. 8A). The term correlation refers to and includes one or more vectors, matrices, formulas, or other mathematical expressions sufficient to define the three-dimensional distance between the IoT product location 790 and the current portable electronic device location 440. Because the localization process occurs frequently, the process of correlation between the IoT product location 790 and the portable electronic device location 440 produces accurate and near real-time tracking of the IoT product location 790 relative to the portable electronic device location 440.

Block 706 recites an example step of determining the portable electronic device location 440 relative to the IoT product location 790 using the captured frames of video data 900. As the portable electronic device 401 moves through the physical environment 600 its location changes relative to the IoT product location 790.

FIG. 8A illustrates an example portable electronic device 410 located in the physical environment 600 at a portable electronic device location 440.

The portable electronic device location 440 in some implementations is estimated using the localization system 915 as described herein.

The process of determining or estimating portable electronic device location 440 relative to the IoT product location 790 in some implementations includes calculating a correlation between the two locations. The term correlation refers to and includes one or more vectors, matrices, formulas, or other mathematical expressions sufficient to define the three-dimensional distance between the current portable electronic device location 440 and the current IoT product location 790. Because the localization process occurs frequently, the process of correlation produces accurate and near real-time tracking of the portable electronic device location 440 relative to the IoT product location 790. In some implementations, the process of estimating the current portable electronic device location 440 is based on the frames of motion data captured using an IMU, or on the frames of video data 900 captured using a camera, or a combination of both.

Block 708 in FIG. 7 recites an example step of detecting a device orientation 80 relative to the physical environment 600 using the IMU 572. FIG. 8A shows an example portable electronic device 401 having a device orientation 80a relative to the physical environment 600. FIG. 8B shows the device 401 at a new device orientation 80b relative to the physical environment 600. FIG. 9 shows an example eyewear device 100 having a device orientation 80c relative to the physical environment 600.

In some implementations the IMU 572 alone is used in the process of detecting the device orientation 80. By contrast, the captured frames of video data 900 are used in the process at block 706 of determining the portable electronic device location 440. In some instances, the device orientation 80 and the portable electronic device location 440 are nearly identical. Both values 80, 440 include coordinates in three dimensions.

In some instances (e.g., when the device orientation 80 or the IMU data is not available) the process of detecting the device orientation 80 includes selecting and using the portable electronic device location 440 as the device orientation 80. Similarly, the device orientation 80 may be used as the portable electronic device location 440 in some instances (e.g., when the portable electronic device location 440 or the video data 900 are not available).

As described herein, the IMU 572 on the portable electronic device 401 (and the IMU 572 of the eyewear device 100) in some implementations includes a collection of motion-sensing components. The motion-sensing components may be micro-electro-mechanical systems (MEMS) with microscopic moving parts, often small enough to be part of a microchip. The IMU 472, 572 in some example configurations includes an accelerometer, a gyroscope, and a magnetometer. The accelerometer senses the linear acceleration of the device 401, 100 (including the acceleration due to gravity) relative to three orthogonal axes (x, y, z). The gyroscope senses the angular velocity of the device 401, 100 about three axes of rotation (pitch, roll, yaw). Together, the accelerometer and gyroscope can provide position, orientation, and motion data about the device 401, 100 relative to six degrees of freedom (x, y, z, pitch, roll, yaw). The magnetometer, if present, senses the heading of the device relative to magnetic north.

In some implementations the process of detecting the device orientation 80 includes detecting a starting device orientation 81 (e.g., generally vertical, as shown in FIG. 8A) and associating the starting device orientation 81 with a current value 82 of one of the controllable features 56 (e.g., the brightness). In the example shown in FIG. 8A, the example current value 82 happens to be 100%; however, this is not always the case. In some implementations, the process of detecting the device orientation 80 includes presenting a highlight or other indicia near the slider 802 when the starting device orientation 81 associated with the current value 82 of a feature. In this example, the user is alerted that the portable device 401 is engaged with the slider 802. The process of detecting a starting device orientation 81 in some implementations occurs when the electronic device location 440 is first detected within a threshold proximity of the IoT product location 790.

The process of detecting the device orientation 80 in this example also includes detecting a final device orientation 89 (e.g., tilted clockwise, as shown in FIG. 8B) and associating the final device orientation 89 with the IoT action 60. The process of detecting a final device orientation 89 in some implementations occurs when the electronic device location 440 is no longer detected within a threshold proximity of the IoT product location 790. In other implementations the process of detecting a final device orientation 89 takes place in response to a user input.

Block 810 in FIG. 7 recites an example step of presenting on the display 580 a virtual rotational interface 800 according to the IoT product location 790 and the portable electronic device location 440. In this example, the virtual rotational interface 800 is presented on the display 580 at a consistent position relative to the IoT product location 790, even as the portable electronic device 401 moves through the physical environment 600. For example, as shown in FIG. 8A, the virtual rotational interface 800 is presented on the display 580 at a viewport position 812 (e.g., near the top or upper section of the IoT lamp 50).

The process of presenting the virtual rotational interface 800 in some implementations includes moving or otherwise adjusting the viewport position 812 relative to the IoT product 50. In some implementations, the IMU control application 910 moves or otherwise adjusts the viewport position 812 so the virtual rotational interface 800 will be presented in the foreground relative to the IoT product 50. In some implementations, the IMU control application 910 moves or otherwise adjusts the viewport position 812 automatically, without user input. The viewport position 812 in some implementations is configurable, such that the process of presenting the virtual rotational interface 800 includes providing the user with one or more tools to adjust or otherwise configure the viewport position 812.

The process of presenting the virtual rotational interface 800 in some implementations includes providing the user with one or more tools to adjust or otherwise configure the virtual rotational interface 800, as described herein, or to start and stop the presentation selectively. For example, the user may pause or stop (or re-start) the process of presenting the virtual rotational interface 800 by speaking a voice command, pressing a push button on the eyewear device 100, executing a hand gesture, or tapping a finger touch 681 on the touchpad 181.

The virtual rotational interface 800 in some implementations includes a slider 802 virtually presented at a slider position 804, as shown in FIG. 8B, according to the detected device orientation 80. For example, in FIG. 8B, the slider position 804 (e.g., in position along the viewport 806 at a clockwise distance from the starting position shown in FIG. 8A) which corresponds to the detected device orientation 80 (e.g., the mobile device 401 has been rotated clockwise relative to its starting orientation).

In some implementations, as shown in FIG. 8A, the virtual rotational interface 800 includes a plurality of sliders 802 (e.g., slider 802 located on the right viewport 806, and slider 802b located on the left viewport). The arched viewports in this example are presented in a semi-circle around the top of the IoT lamp 50.

The process of presenting a virtual rotational interface 800 in some implementations includes presenting the slider 802 (and the viewport 806 if present) as an overlay relative to the physical environment 600, such that the virtual rotational interface 800 is persistently viewable in the foreground relative to the real objects in the physical environment 600. For example, as shown in FIG. 8A, the virtual rotational interface 800 is presented as an overlay (e.g., in the foreground, in front of the lamp 50) relative to the physical environment 600 (e.g., the lamp 50 and the walls behind it), such that the virtual rotational interface 800 is persistently viewable relative to other objects in the physical environment 600.

In some implementations, the process of presenting a virtual rotational interface 800 includes rendering or otherwise graphically generating the slider 802 (and the viewport 806 if present) at a predefined and configurable size and shape. For example, as shown in FIG. 8A, the virtual rotational interface 800 is presented at a size that nearly fills the available space on the display 580. In some implementations, the relative size of the virtual rotational interface 800 changes automatically, based on the IoT product location 790, the portable electronic device location 440, and the available space on the display 580.

The process of presenting a virtual rotational interface 800 in some implementations includes presenting indicia at a position on the display 580 near the slider 802. In some implementations the indicia are associated with one or more of the controllable features 56. For example, in FIG. 8A, the indicia include a window displaying a value of 100%. After the slider 802 has moved, as shown in FIG. 8B, the indicia include a window displaying a value of 59%.

The process of presenting a virtual rotational interface 800 in some implementations includes presenting the interface 800 when the electronic device location 440 is within a threshold proximity of the IoT product 50 (e.g., mathematically evaluating the distance between the electronic device location 440 and the IoT product location 790). In this example, the virtual rotational interface 800 appears when the electronic device 401 is near the IoT product 50.

The process of presenting the virtual rotational interface 800 in some implementations includes estimating a plane of device rotation 820 using the IMU 572. The plane of device rotation 820 generally corresponds to the plane of rotation as detected by the IMU 572 inside the portable device 401. The device rotation plane 820 in some implementations is an average or median of a series of values gathered by the IMU 572 over time. The device rotation plane 820 is represented graphically in FIG. 8B by a circular arrow near the top edge of the device 401. The process at block 710 in some implementations includes presenting the virtual rotational interface 800 in accordance with the estimated device rotation plane 820, such that the interface 800 appears to be aligned on the display 580 with the plane of device rotation 820 (e.g., as the portable device 410 rotates over time).

Block 712 in FIG. 7 recites an example step of sending a control signal 55 to the IoT product 50 in accordance with the device orientation 80. The process of sending the control signal 55 in some implementations includes sending the control signal 55 using a wireless transceiver to the IoT product 50, sending the control signal 55 to a cloud-based service which in turn transmits the control signal 55 to the IoT product 50, or otherwise broadcasting the control signal 55 using a method and manner to facilitate delivery of the control signal 55 to the IoT product 50.

The control signal 55 in some implementations includes instructions configured for use by the IoT product 50 to facilitate the execution or performance of the associated IoT action 60. For example, when a device orientation 80 (e.g., rotated clockwise relative to vertical) corresponds to a particular IoT action 60 (e.g., reducing the brightness), the control signal 55 includes instructions for the IoT product 50 to execute the IoT action 60 (e.g., reducing the brightness accordingly).

Block 714 in FIG. 7 recites an example step of the IoT product 50 executing or otherwise performing the IoT action 60 according to the device orientation 80. The control signal in some implementations includes instructions for use by the IoT product 50 for performing or otherwise executing the IoT action 60.

Block 716 in FIG. 7 recites an example step of establishing and calibrating a virtual scale 810. The IoT product 50 in some implementations includes or is associated with a product API 52 as described herein. The product API 52 in some implementations includes a controllable feature 56 (e.g., brightness) and a range 58 of variable values 59 (e.g., from zero to one hundred percent, from one to eleven, and the like).

The virtual scale 810 in some implementations extends from a low end 811 to a high end 819. For example, FIG. 8B shows a viewport 806 extending from a low end 811 in a clockwise direction toward a high end 819. In this example the low end 811 represents a maximum brightness of 100% and the high end 819 represents a minimum brightness.

The process of calibrating a virtual scale 810 (e.g., low end 811 to high end 819) includes in some implementations comparing the virtual scale 810 with the range of values 59 (e.g., one hundred to zero) and mathematically correlating the length of the virtual scale 810 (e.g., ninety degrees) to the range of values 59 (e.g., one hundred to zero). In this example, mathematically, each nine-degree increment along the virtual scale 810 correlates with a ten-percent increment in the brightness values 59.

The steps are described with reference to the portable electronic device 401 (e.g., a mobile phone). The methods and systems described herein, in some implementations, may be executed and operated on an eyewear device 100, a mobile phone 401, or another electronic device. For example, in some implementations, the portable electronic device 401 is an electronic eyewear device 100 as described herein. In this example, the camera 570 is an eyewear camera 114B, the display 580 is an eyewear display 182B, the IMU 572 is the eyewear IMU 472, the memory elements 540A, 540B, 540C are the eyewear memory 434, and so forth.

In some implementations the methods and systems described herein are processed and executed using a portable electronic device 401 (e.g., a mobile phone) and the virtual rotational interface 800 is presented on the display 580 of the mobile phone 401, or on the display 182B of the eyewear device 100, or both. In this example, the IMU of the mobile phone 401 controls the device orientation 80 and the slider 802, while the virtual rotational interface 800 is observable by someone wearing an electronic eyewear device 100.

Any of the functionality described herein for the eyewear device 100, the mobile device 401, and the server system 498 can be embodied in one or more computer software applications or sets of programming instructions, as described herein. According to some examples, "function," "functions," "application," "applications," "instruction," "instructions," or "programming" are program(s) that execute functions defined in the programs. Various programming languages can be employed to develop one or more of the applications, structured in a variety of manners, such as object-oriented programming languages (e.g., Objective-C, Java, or C++) or procedural programming languages (e.g., C or assembly language). In a specific example, a third-party application (e.g., an application developed using the ANDROID™ or IOS™ software development kit (SDK) by an entity other than the vendor of the particular platform) may include mobile software running on a mobile operating system such as IOS™ ANDROID™, WINDOWS® Phone, or another mobile operating system. In this example, the third-party application can invoke API calls provided by the operating system to facilitate functionality described herein.

Hence, a machine-readable medium may take many forms of tangible/non-transitory storage medium. Non-volatile storage media include, for example, optical or magnetic disks, such as any of the storage devices in any computer devices or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code or data. Many of these forms of computer readable media may be involved in carrying one or more sequences of one or more instructions/program code to a processor for execution.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as plus or minus ten percent from the stated amount or range.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A method of controlling an Internet of Things (IoT) product using a portable electronic device comprising an inertial measurement unit (IMU), a camera, and a display, wherein the IoT product is associated with a product API comprising a product type and a controllable feature associated with a range of variables values, the method comprising:
   capturing frames of video data with the camera;
   detecting the IoT product at an IoT product location in a physical environment using the captured frames of video data;
   determining a portable electronic device location relative to the IoT product location using the captured frames of video data;
   detecting a device orientation relative to the physical environment using the IMU;
   establishing a virtual scale relative to the device orientation, the virtual scale extending angularly from a low end clockwise to a high end;
   calibrating the virtual scale with the range of variable values;
   presenting on the display a virtual rotational interface at a viewport position according to the IoT product location and the portable electronic device location, wherein the virtual rotational interface comprises a slider virtually presented at a slider position according to the detected device orientation and the calibrated virtual scale, and wherein the slider position corresponds to an IoT action; and sending a control signal to the IoT product in accordance with the detected device orientation, the control signal comprising instructions for use by the IoT product to perform the IoT action.

2. The method of claim 1, further comprising:
executing the IoT action by the IoT product in accordance with the instructions.

3. The method of claim 1, wherein the IoT product comprises a controllable feature characterized by a current value, wherein the presenting the virtual rotational interface further comprises:

presenting the virtual rotational interface when the portable electronic device location is within a threshold proximity of the IoT product; and wherein the detecting a device orientation further comprises:

detecting a starting device orientation when the portable electronic device location is first detected within the threshold proximity;

associating the starting device orientation with a current value of the controllable feature;

detecting a final device orientation when the portable electronic device location is no longer detected within the threshold proximity; and associating the final device orientation with the IoT action.

4. The method of claim 3, further comprising:
detecting a final device orientation in response to a user input.

5. The method of claim 1, wherein the presenting the virtual rotational interface further comprises:

presenting the slider relative to a viewport;

presenting an additional slider virtually presented at an additional slider position relative to an additional viewport, wherein additional slider position corresponds to an additional IoT action;

associating the detected device orientation with at least one of the slider and the additional slider in response to a user input; and presenting at least one of the slider and the additional slider according to the association and the detected device orientation.

6. The method of claim 1, wherein the presenting the virtual rotational interface further comprises:

estimating a plane of device rotation using the IMU; and presenting the virtual rotational interface in accordance with the estimated plane of device rotation.

7. The method of claim 1, further comprising:
executing the IoT action by the IoT product by selecting an IoT action based on the detected device orientation.

8. A portable electronic device for controlling an Internet of Things (IoT) product, wherein the IoT product is associated with a product API comprising a product type and a controllable feature associated with a range of variable values, the portable electronic device comprising:

a processor;
a memory;
an inertial measurement unit (IMU);
a camera;
a display; and programming in the memory, wherein execution of the programming by the processor configures the portable electronic device to perform functions, including functions to:

capture frames of video data with the camera;

detect the IoT product at an IoT product location in a physical environment using the captured frames of video data;

determine a portable electronic device location relative to the IoT product location using the captured frames of video data;

detect a device orientation using the IMU relative to the physical environment;

establish a virtual scale relative to the device orientation, the virtual scale extending angularly from a low end clockwise to a high end;

calibrate the virtual scale with the range of variable values;

present on the display a virtual rotational interface at a viewport position according to the IoT product location and the portable electronic device location, wherein the virtual rotational interface comprises a slider virtually presented at a slider position according to the detected device orientation and the calibrated virtual scale, and wherein the slider position corresponds to an IoT action; and send a control signal to the IoT product in accordance with the detected device orientation, the control signal comprising instructions for use by the IoT product to perform the IoT action.

9. The portable electronic device of claim 8, wherein the execution of the programming further configures portable electronic device to perform functions to:

detect an execution of the IoT action by the IoT product in accordance with the instructions.

10. The portable electronic device of claim 8, wherein the IoT product comprises a controllable feature characterized by a current value, and wherein the execution of the programming further configures portable electronic device to perform functions to:

present the virtual rotational interface when the portable electronic device location is within a threshold proximity of the IoT product;

detect a starting device orientation when the portable electronic device location is first detected within the threshold proximity;

associate the starting device orientation with a current value of the controllable feature;

detect a final device orientation when the portable electronic device location is no longer detected within the threshold proximity; and associate the final device orientation with the IoT action.

11. The portable electronic device of claim 8, wherein the execution of the programming further configures portable electronic device to perform functions to:

detect a final device orientation in response to a user input.

12. The portable electronic device of claim 8, wherein the execution of the programming further configures portable electronic device to perform functions to:

present the slider relative to a viewport;

present an additional slider virtually presented at an additional slider position relative to an additional viewport, wherein additional slider position corresponds to an additional IoT action;

associate the detected device orientation with at least one of the slider and the additional slider in response to a user input; and present at least one of the slider and the additional slider according to the association and the detected device orientation.

13. The portable electronic device of claim 8, wherein the execution of the programming further configures portable electronic device to perform functions to:

estimate a plane of device rotation using the IMU; and present the virtual rotational interface in accordance with the estimated plane of device rotation.

14. The portable electronic device of claim 8, wherein the execution of the programming further configures portable electronic device to perform functions to:

detect an execution of the IoT action by the IoT product, wherein the execution comprises selecting an IoT action based on the detected device orientation.

15. A non-transitory computer-readable medium storing program code that, when executed, is operative to cause a processor of a portable electronic device to perform the steps of:

capturing frames of video data with a camera coupled to the portable electronic device;

detecting an Internet of Things (IoT) product at an IoT product location in a physical environment using the captured frames of video data, wherein the IoT product is associated with a product API comprising a product type and a controllable feature associated with a range of variable values;

determining a portable electronic device location relative to the IoT product location using the captured frames of video data;

detecting a device orientation relative to the physical environment using an inertial measurement unit (IMU) coupled to the portable electronic device;

establishing a virtual scale relative to the device orientation, the virtual scale extending angularly from a low end clockwise to a high end;

calibrating the virtual scale with the range of variable values;

presenting on a display coupled to the portable electronic device a virtual rotational interface at a viewport position according to the IoT product location and the portable electronic device location, wherein the virtual rotational interface comprises a slider virtually presented at a slider position according to the detected device orientation and the calibrated virtual scale, and wherein the slider position corresponds to an IoT action; and sending a control signal to the IoT product in accordance with the detected device orientation, the control signal comprising instructions for use by the IoT product to perform the IoT action.

16. The non-transitory computer-readable medium storing program code of claim 15, wherein the program code when executed is operative to cause the processor to perform the further steps of:

detecting the IoT action by the IoT product in accordance with the instructions;

presenting the virtual rotational interface when the portable electronic device location is within a threshold proximity of the IoT product;

detecting a starting device orientation when the portable electronic device location is first detected within the threshold proximity;

associating the starting device orientation with a current value associated with a controllable feature;

detecting a final device orientation when the portable electronic device location is no longer detected within the threshold proximity;

detecting a final device orientation in response to a user input; and associating the final device orientation with the IoT action.

17. The non-transitory computer-readable medium storing program code of claim 15, wherein the program code when executed is operative to cause the processor to perform the further steps of:

presenting the slider relative to a viewport;

presenting an additional slider virtually presented at an additional slider position relative to an additional viewport, wherein additional slider position corresponds to an additional IoT action;

associating the detected device orientation with at least one of the slider and the additional slider in response to a user input; and presenting at least one of the slider and the additional slider according to the association and the detected device orientation.

* * * * *